United States Patent
Luick et al.

(10) Patent No.: US 7,783,860 B2
(45) Date of Patent: Aug. 24, 2010

(54) LOAD MISALIGNED VECTOR WITH PERMUTE AND MASK INSERT

(75) Inventors: David Arnold Luick, Rochester, MN (US); Eric Oliver Mejdrich, Rochester, MN (US); Adam James Muff, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 11/830,920

(22) Filed: Jul. 31, 2007

(65) Prior Publication Data

US 2009/0037694 A1 Feb. 5, 2009

(51) Int. Cl.
*G06F 9/312* (2006.01)
(52) U.S. Cl. .............................. 712/6; 712/5
(58) Field of Classification Search ........................ None
See application file for complete search history.

(56) References Cited

U.S. PATENT DOCUMENTS

| | | | | |
|---|---|---|---|---|
| 5,913,054 A * | 6/1999 | Mallick et al. | ............... | 712/220 |
| 5,922,066 A * | 7/1999 | Cho et al. | ............... | 712/204 |
| 5,933,650 A * | 8/1999 | van Hook et al. | ............... | 712/2 |
| 5,961,628 A * | 10/1999 | Nguyen et al. | ............... | 712/2 |
| 6,154,831 A * | 11/2000 | Thayer et al. | ............... | 712/208 |
| 6,334,176 B1 * | 12/2001 | Scales et al. | ............... | 712/4 |
| 6,397,324 B1 * | 5/2002 | Barry et al. | ............... | 712/225 |
| 6,553,474 B2 * | 4/2003 | Ito et al. | ............... | 711/201 |
| 6,785,841 B2 * | 8/2004 | Akrout et al. | ............... | 714/11 |
| 7,254,699 B2 * | 8/2007 | Shepherd | ............... | 712/225 |
| 2005/0160402 A1 * | 7/2005 | Wang et al. | ............... | 717/114 |

* cited by examiner

*Primary Examiner*—Eric Coleman
(74) *Attorney, Agent, or Firm*—Patterson & Sheridan LLP

(57) ABSTRACT

Embodiments of the invention provide logic within the store data path between a processor and a memory array. The logic may be configured to misalign vector data as it is stored to memory. By misaligning vector data as it is stored to memory, memory bandwidth may be maximized while processing bandwidth required to store vector data misaligned is minimized. Furthermore, embodiments of the invention provide logic within the load data path which allows vector data which is stored misaligned to be aligned as it is loaded into a vector register. By aligning misaligned vector data as it is loaded into a vector register, memory bandwidth may be maximized while processing bandwidth required to align misaligned vector data may be minimized.

13 Claims, 18 Drawing Sheets

$$A = (X_A, Y_A, Z_A)$$
$$B = (X_B, Y_B, Z_B)$$

$$N = A \times B = \begin{vmatrix} \hat{X} & \hat{Y} & \hat{Z} \\ X_A & Y_A & Z_A \\ X_B & Y_B & Z_B \end{vmatrix} = \begin{matrix} \hat{X}(Y_A Z_B - Y_B Z_A) + \\ \hat{Y}(X_B Z_A - X_A Z_B) + \\ \hat{Z}(X_A Y_B - X_B Y_A) \end{matrix}$$

|        | 0   | 31 | 63 | 95 | 127 |
|--------|-----|------|------|------|--------|
|        | WORD 0 | WORD 1 | WORD 2 | WORD 3 | |
| 0x0000 | Ax | Ay | Az | UNUSED |
| 0x0010 | Bx | By | Bz | UNUSED |
| 0x0020 | Cx | Cy | Cz | UNUSED |
| 0x0030 | Dx | Dy | Dz | UNUSED |

| | 0   WORD 0 | 31   WORD 1 | 63   WORD 2 | 95   WORD 3 | 127 |
|---|---|---|---|---|---|
| 0x0000 | Ax | Ay | Az | Bx | ⎫ |
| 0x0010 | By | Bz | Cx | Cy | ⎬ 900 |
| 0x0020 | Cz | Dx | Dy | Dz | ⎭ |

*FIG. 10*

| LSB OF ADDRESS | LOAD-HIGH ROTATE LEFT | LOAD-HIGH MASK | LOAD-LOW ROTATE LEFT | LOAD-LOW MASK |
|---|---|---|---|---|
| 0x0 | 0 | b1111 | 0 | b0000 |
| 0x4 | 1 | b1110 | 1 | b0001 |
| 0x8 | 2 | b1100 | 2 | b0011 |
| 0xC | 3 | b1000 | 3 | b0111 |

LOAD MISALIGNED VECTOR WITH PERMUTE AND MASK INSERT

BACKGROUND OF THE INVENTION

1. Field of the Invention

The present invention is generally related to the field of image processing, and more specifically to an instruction set for processing images.

2. Description of the Related Art

The process of rendering two-dimensional images from three-dimensional scenes is commonly referred to as image processing. A particular goal of image rendering is to make two-dimensional simulations or renditions of three-dimensional scenes as realistic as possible. This quest for rendering more realistic scenes has resulted in an increasing complexity of images and innovative methods for processing the complex images.

Two-dimensional images representing a three-dimensional scene are typically displayed on a monitor or some type of display screen. Modern monitors display images through the use of pixels. A pixel is the smallest area of space which can be illuminated on a monitor. Most modern computer monitors use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One method for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two dimensional plane. Furthermore, the computational power required to render a scene with rasterization scales directly with an increase in the complexity of objects in the scene to be rendered. As image processing becomes more realistic, rendered scenes become more complex. Therefore, rasterization suffers as image processing evolves, because rasterization scales directly with complexity.

Another method for rendering a real world three-dimensional scene onto a two-dimensional monitor using pixels is called ray tracing. The ray tracing technique traces the propagation of imaginary rays, which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors, for example, the effect of light sources, are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two dimensional synthesis of the three-dimensional scene can be displayed on the computer screen to the viewer.

Ray tracing typically renders real world three dimensional scenes with more realism than rasterization. This is partially due to the fact that ray tracing simulates how light travels and behaves in a real world environment, rather than simply projecting a three dimensional shape onto a two dimensional plane as is done with rasterization. Therefore, graphics rendered using ray tracing more accurately depict on a monitor what our eyes are accustomed to seeing in the real world.

Furthermore, ray tracing also handles increasing scene complexity better than rasterization. Ray tracing scales logarithmically with scene complexity. This is due to the fact that the same number of rays may be cast into a scene, even if the scene becomes more complex. Therefore, ray tracing does not suffer in terms of computational power requirements as scenes become more complex unlike rasterization.

However, one major drawback of ray tracing is the large number of floating point calculations, and thus increased processing power, required to render scenes. This leads to problems when fast rendering is needed, for example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Image processing using, for example, ray tracing, may involve performing both vector and scalar math. Accordingly, hardware support for image processing may include vector and scalar units configured to perform a wide variety of calculations. The vector and scalar operations, for example, may trace the path of light through a scene, or move objects within a three-dimensional scene. A vector unit may perform operations, for example, dot products and cross products, on vectors related to the objects in the scene. A scalar unit may perform arithmetic operations on scalar values, for example, addition, subtraction, multiplication, division, and the like.

The vector and scalar units may be pipelined to improve performance. However, performing vector operations may involve performing multiple iterations of multiple instructions which may be dependent on each other. Such dependencies between instructions may reduce the efficiency of the pipelined units. For example, several pipeline stages may be left unused in order for a first instruction to complete prior to execution of a second instruction.

Furthermore, each vector unit may be coupled with a register file comprising the vector data processed by the vector unit. The vector data may be contained in one or more locations in one or more registers. Therefore, one or more instructions may be issued to rearrange the vector data in desired locations within a target register. The multiple instructions rearranging vector data may limit the efficiency of vector processing by consuming a significant portion of the issue bandwidth. Additionally, the one or more instructions rearranging vector data may be dependent on one another, thereby introducing further pipeline stalls and unused pipeline stages that further limit efficiency.

Moreover, rearranging vector data may require the use of multiple temporary registers. The use of large numbers of temporary registers introduces yet another inefficiency because it requires the construction of large register files that consume valuable space and limit processing of vector data based on the availability of registers.

Therefore, what is needed are more efficient methods, systems, and articles of manufacture for processing vector data.

SUMMARY OF THE INVENTION

The present invention is generally related to the field of image processing, and more specifically to an instruction set for processing images.

One embodiment provides a method of loading data from a processor to memory. The method includes: (a) configuring at least one multiplexer; (b) receiving a load vector instruction; (c) aligning the vector data; and (d) writing the aligned vector data into the target vector register.

Another embodiment provides a computer-readable medium containing a program for processing vector data. When executed by a processor, the program performs operations generally including configuring at least one multiplexer, receiving a store vector instruction, misaligning the vector data, and storing the misaligned vector data.

Another embodiment provides a system comprising multiple processors communicably coupled with one another. Each processor includes (a) a register file comprising multiple registers; (b) a memory array; (c) logic configured to receive a store-misaligned-vector instruction; and (d) a store permute unit in a data path between the register file and the memory array configured to misalign the vector data.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 9 and 10 illustrate data stored within an exemplary memory array, according to an embodiment of the invention.

FIG. 22 illustrates an exemplary rotate-and-mask table, according to an embodiment of the invention.

DETAILED DESCRIPTION OF THE PREFERRED EMBODIMENTS

Figure 1:
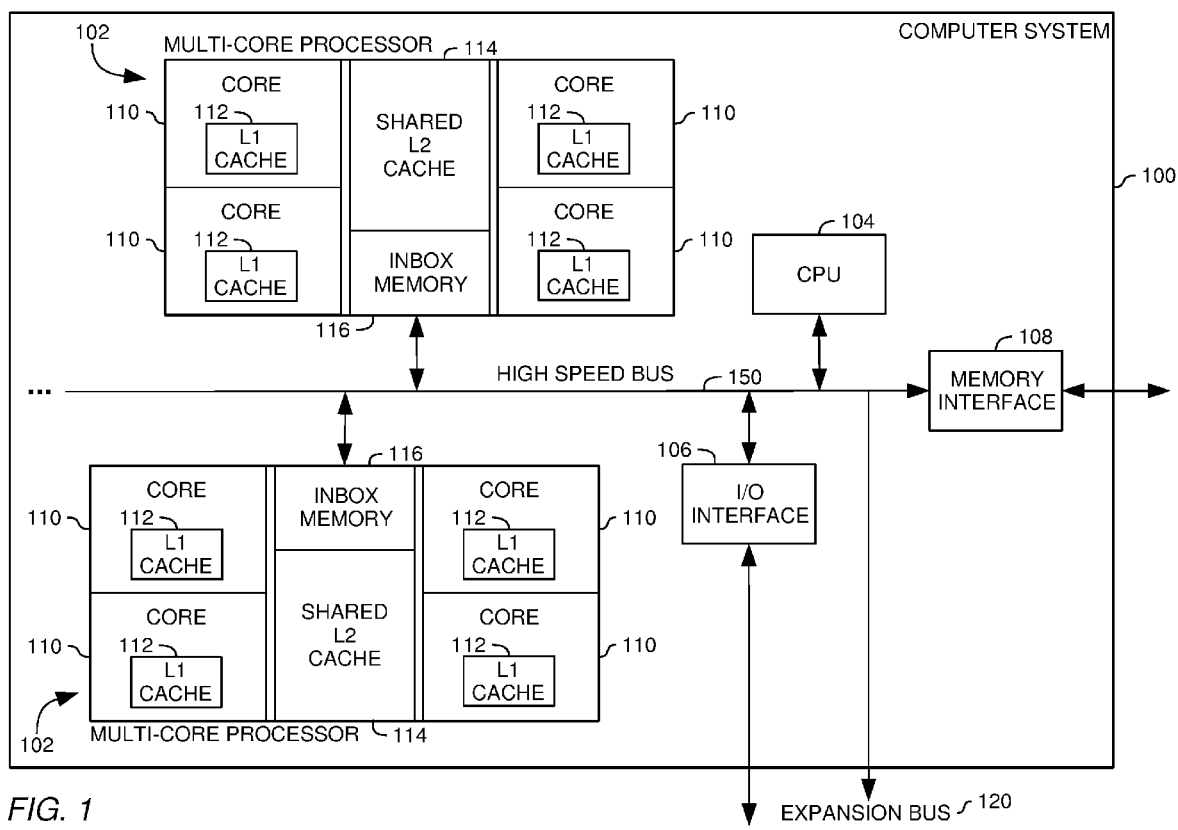
FIG. 1 illustrates a computer system, according to one embodiment of the invention.

The present invention is generally related to the field of image processing, and more specifically to methods and apparatus for handling data which may be related to image processing tasks. According to one embodiment of the invention, methods and apparatus are provided for aligning vector data as it is loaded from memory into a vector register file within a processor. Embodiments of the invention may align vector data which is misaligned in memory by passing the misaligned vector data through multiplexers which are in a load data path between memory and the vector register file. According to another embodiment of the invention, methods and apparatus are provided which misalign vector data as it is stored to memory. Embodiments of the invention may misalign vector data as it is stored to memory by passing aligned vector data through multiplexers which are in a store data path between the vector register file and memory.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module). Furthermore, while described below with respect to a processor having multiple processor cores and multiple L1 caches, embodiments of the invention may be utilized with any processor which utilizes a cache, including processors which have a single processing core. In general, embodiments of the invention may be utilized with any processor and are not limited to any specific configuration.

Program Products used with a Computer System

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Computer System

FIG. 1 is a block diagram depicting the computer system 100 according to one embodiment of the invention. The system 100 may contain a one or more multi-core processors 102. Each multi-core unit 102 may include multiple cores 110 each arranged around a shared level two cache (L2 cache) 114. The shared L2 cache 114 may include a portion of memory, referred to herein as inbox memory 116, which, as described below, may be used to manage memory access for threads being executed by the cores 110 in a multi-core unit 102. Each core 110 may also include a level one cache (L1 cache) 112 which, in some cases, may be used exclusively by that core 110.

In some cases, the system 100 may also include a further central processing unit (CPU) 104 which, in some cases, may provide additional processing functionality. The system 100 may also include an input/output (I/O) interface 106 and a memory interface 108 which may be used to communicate with external I/O device and additional system memory, respectively. Each of the components within the system may communicate across a high speed processor bus 150. The system 100 may also include an expansion bus 120 which may be used to connect the multi-core processor to additional system components. While depicted as separate components of a computer system 100, in some cases, two or more of the items depicted in FIG. 1 may be combined as part of a system on a chip (SOC).

Each processor core 110 may contain a plurality of processing threads and a core cache (e.g., an L1 cache). The processing threads located within each processor core 110 may have access to the shared L2 cache 114.

The processor cores 110 may also have access to a plurality of inboxes within the inbox memory 116. The inboxes may be memory mapped address space. The inboxes may be mapped to the processing threads located within each of the processor cores 110. Each thread located within the processor cores 110 may have a memory mapped inbox and access to all of the other memory mapped inboxes. The inboxes may make up a low latency and high bandwidth communications network used by the processor cores 110.

The processor cores 110 may use the inboxes as a network to communicate with each other and redistribute data processing work amongst the processor cores 110. For some embodiments, separate outboxes may be used in the communications network, for example, to receive the results of processing by processor cores 110. For other embodiments, inboxes may also serve as outboxes, for example, with one processor core 110 writing the results of a processing function directly to the inbox of another processor core 110 that will use the results.

The aggregate performance of an image processing system may be tied to how well the processor cores 110 can partition and redistribute work. The network of inboxes may be used to collect and distribute work to other processor cores 110 without corrupting the shared L2 cache 114 with processor cores 110 communication data packets that have no frame to frame coherency. An image processing system which can render many millions of triangles per frame may include many processor cores 110 connected in this manner.

In one embodiment of the invention, the threads of one processor core 110 may be assigned to a workload manager. An image processing system may use various software and hardware components to render a two dimensional image from a three dimensional scene. According to one embodiment of the invention, an image processing system may use a workload manager to traverse a spatial index with a ray issued by the image processing system. A spatial index, may be implemented as a tree type data structure used to partition a relatively large three dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads on the multi-core processor may be vector throughput engines. After a workload manager determines a ray-bounding volume intersection, the workload manager may issue (send), via the inboxes, the ray to one of a plurality of vector throughput engines. The vector throughput engines may then determine if the ray intersects a primitive contained within the bounding volume. The vector throughput engines may also perform operations relating to determining the color of the pixel through which the ray passed.

Figure 2:
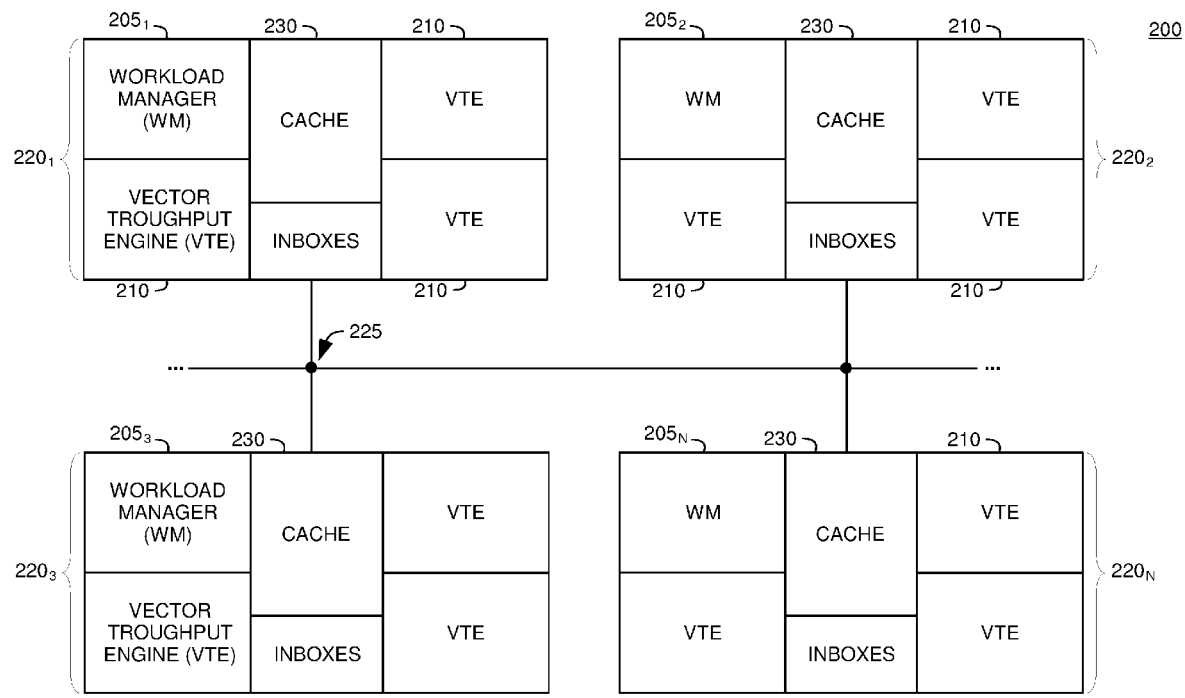
FIG. 2 illustrates a multiple core processing element network, according to an embodiment of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each processor 220 in the network of multiple core processing elements 200 may also contain a plurality of vector throughput engines 210, according to one embodiment of the invention.

The workload managers $220_{1-N}$ may use a high speed bus 225 to communicate with other workload managers $220_{1-N}$ and/or vector throughput engines 210 of other multiple core processing elements 220, according to one embodiment of the invention. Each of the vector throughput engines 210 may use the high speed bus 225 to communicate with other vector throughput engines 210 or the workload managers 205. The workload manager processors 205 may use the high speed bus 225 to collect and distribute image processing related tasks to other workload manager processors 205, and/or distribute tasks to other vector throughput engines 210. The use of a high speed bus 225 may allow the workload managers $205_{1-N}$ to communicate without affecting the caches 230 with data packets related to workload manager 205 communications.

An Exemplary Three Dimensional Scene

Figure 3:
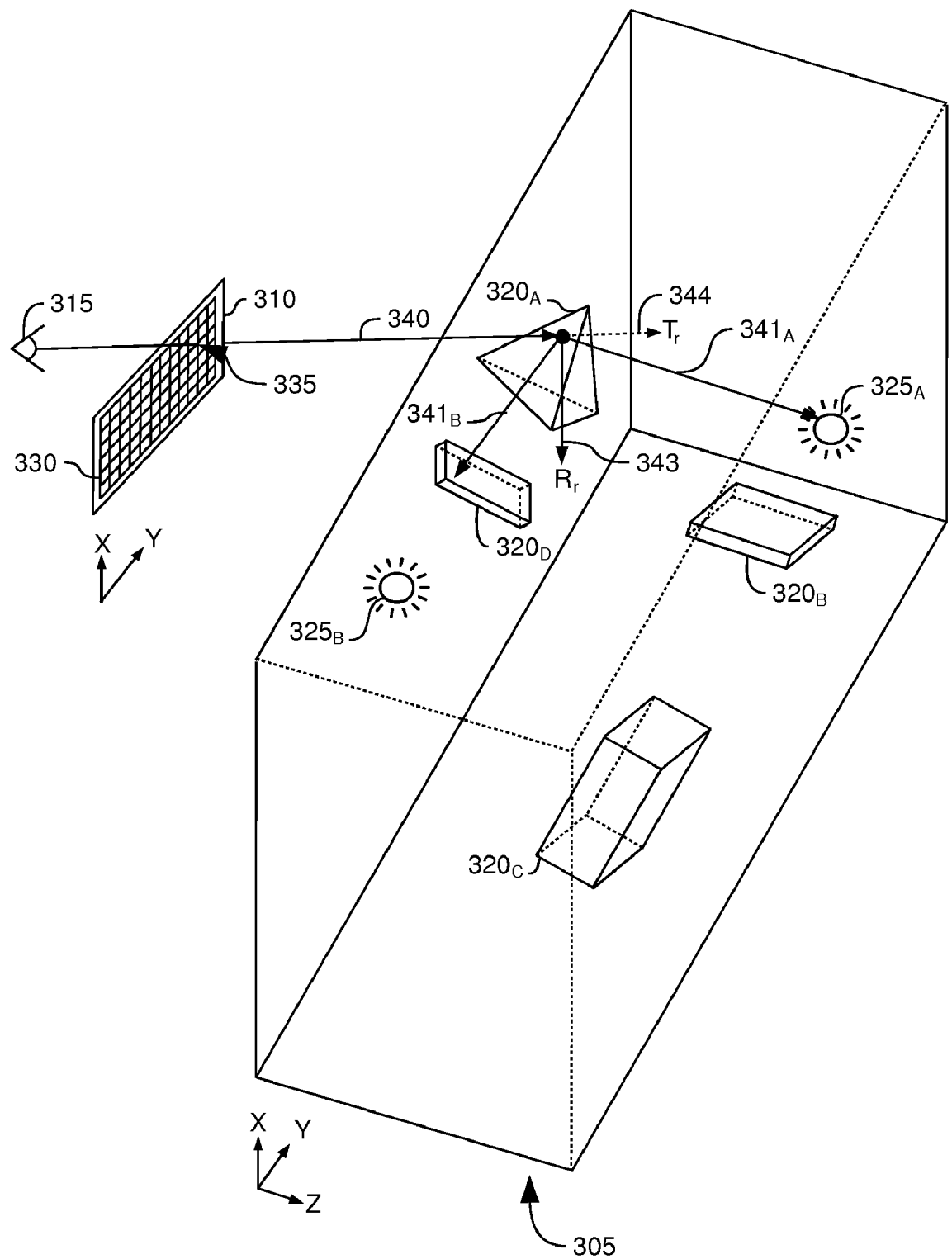
FIG. 3 is an exemplary three dimensional scene to be rendered by an image processing system, according to one embodiment of the invention.

FIG. 3 is an exemplary three dimensional scene 305 to be rendered by an image processing system. Within the three dimensional scene 305 may be objects 320. The objects 320 in FIG. 3 are of different geometric shapes. Although only four objects 320 are illustrated in FIG. 3, the number of objects in a typical three dimensional scene may be more or less. Commonly, three dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three dimensional scene 305 may be rendered into a two-dimensional picture by an image processing system. The image processing system may also cause the two-dimensional picture to be displayed on a monitor 310. The monitor 310 may use many pixels 330 of different colors to render the final two-dimensional picture.

One method used by image processing systems to render a three-dimensional scene 320 into a two dimensional picture is called ray tracing. Ray tracing is accomplished by the image processing system "issuing" or "shooting" rays from the perspective of a viewer 315 into the three-dimensional scene 320. The rays have properties and behavior similar to light rays.

One ray 340, that originates at the position of the viewer 315 and traverses through the three-dimensional scene 305, can be seen in FIG. 3. As the ray 340 traverses from the viewer 315 to the three-dimensional scene 305, the ray 340 passes through a plane where the final two-dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid 330 of thousands (if not millions) of pixels to render the final scene on the monitor 310. Each individual pixel may display a different color to render the final composite two-dimensional picture on the monitor 310. An image processing system using a ray tracing image processing methodology to render a two dimensional picture from a three-dimensional scene will calculate the colors that the issued ray or rays encounters in the three dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 335 in the two dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three dimensional scene the ray 340 may strike objects. As the rays strike objects within the scene the color of the object may be assigned the pixel through which the ray passes. However, the color of the object must be determined before it is assigned to the pixel.

Many factors may contribute to the color of the object struck by the original ray 340. For example, light sources within the three dimensional scene may illuminate the object. Furthermore, physical properties of the object may contribute to the color of the object. For example, if the object is reflective or transparent, other non-light source objects may then contribute to the color of the object.

In order to determine the effects from other objects within the three dimensional scene, secondary rays may be issued from the point where the original ray 340 intersected the object. For example, one type of secondary ray may be a shadow ray. A shadow ray may be used to determine the contribution of light to the point where the original ray 340 intersected the object. Another type of secondary ray may be a transmitted ray. A transmitted ray may be used to determine what color or light may be transmitted through the body of the object. Furthermore, a third type of secondary ray may be a reflected ray. A reflected ray may be used to determine what color or light is reflected onto the object.

As noted above, one type of secondary ray may be a shadow ray. Each shadow ray may be traced from the point of intersection of the original ray and the object, to a light source within the three-dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $341_B$ may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source $325_B$ will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 344 is seen traversing through the object $320_A$ which the original ray 340 intersected.

Another type of secondary ray is a reflected ray. If the object with which the original ray intersected has reflective properties (e.g. a metal finish), then a reflected ray will be issued by the image processing system to determine what color or light may be reflected by the object. Reflected rays traverse away from the object at an angle relative to the angle at which the original ray intersected the object. For example, reflected ray 343 may be issued by the image processing system to determine what color or light may be reflected by the object $320_A$ which the original ray 340 intersected.

The total contribution of color and light of all secondary rays (e.g., shadow rays, transmitted rays, reflected rays, etc.) will result in the final color of the pixel through which the original ray passed.

Vector Operations

Processing images may involve performing one or more vector operations to determine, for example, intersection of rays and objects, generation of shadow rays, reflected rays, and the like. One common operation performed during image processing is the cross product operation between two vectors. A cross product may be performed to determine a normal vector from a surface, for example, the surface of a primitive of an object in a three dimensional scene. The normal vector may indicate whether the surface of the object is visible to a viewer.

Figure 4:
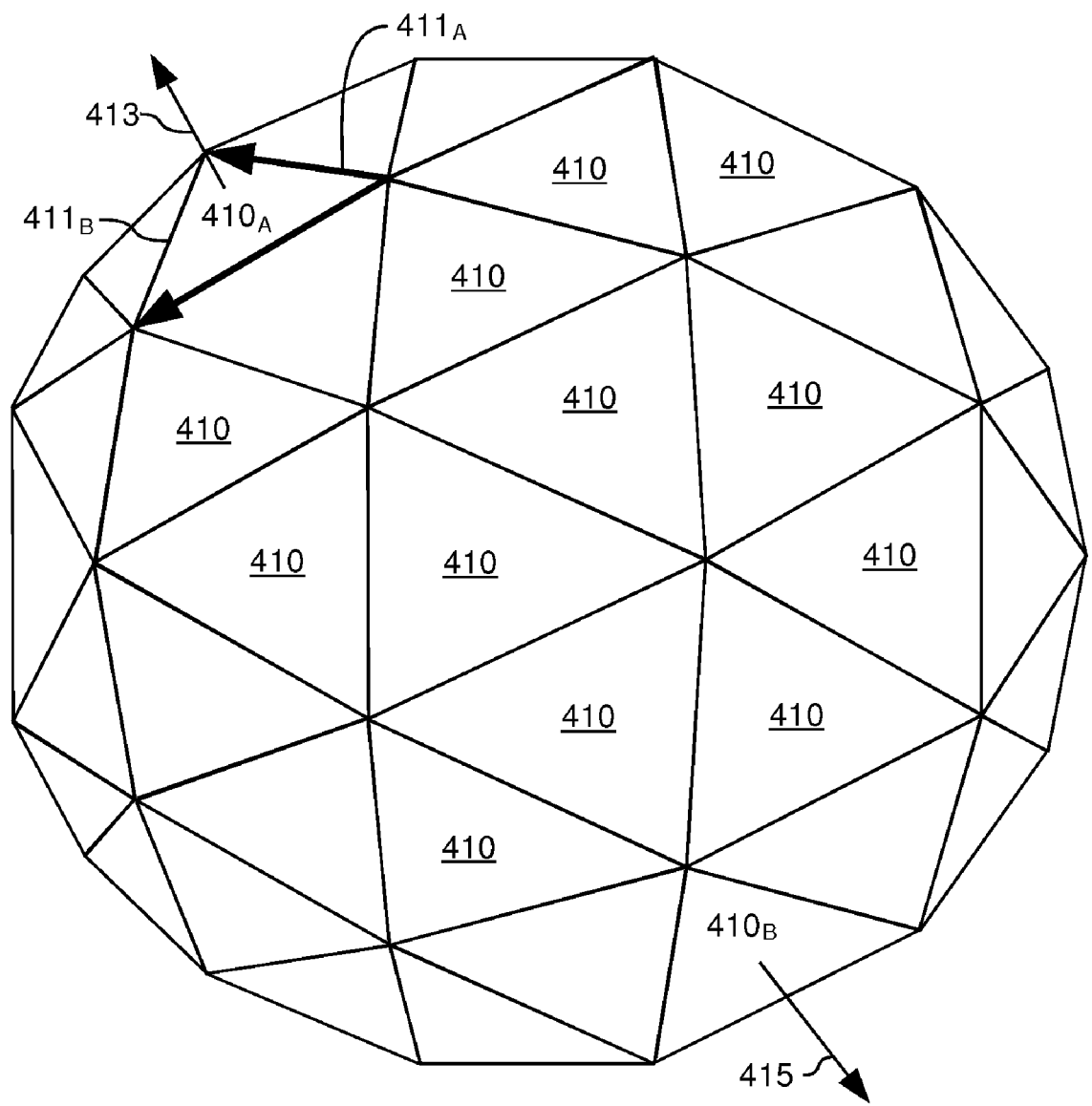
FIG. 4 illustrates a detailed view of an object to be rendered on a screen, according to an embodiment of the invention.

As previously described, each object in a scene may be represented as a plurality of primitives connected to one another to form the shape of the object. For example, in one embodiment, each object may be composed of a plurality of interconnected triangles. FIG. 4 illustrates an exemplary object 400 composed of a plurality of triangles 410. Object 400 may be a spherical object, formed by the plurality of triangles 410 in FIG. 4. For purposes of illustration a crude spherical object is shown. One skilled in the art will recognize that the surface of object 400 may be formed with a greater number of smaller triangles 410 to better approximate a curved object.

In one embodiment of the invention, the surface normal for each triangle 410 may be calculated to determine whether the surface of the triangle is visible to a viewer 450. To determine the surface normal for each triangle, a cross product operation may be performed between two vectors representing two sides of the triangle. For example, the surface normal 413 for triangle 410a may be computed by performing a cross product between vectors 411a and 411b.

The normal vector may determine whether a surface, for example, the surface of a primitive, faces a viewer. Referring to FIG. 4, normal vector 413 points in the direction of viewer 450. Therefore, triangle 410 may be displayed to the user. On the other hand, normal vector 415 of triangle 410b points away from viewer 450. Therefore, triangle 410b may not be displayed to the viewer.

Figures 5, 6:
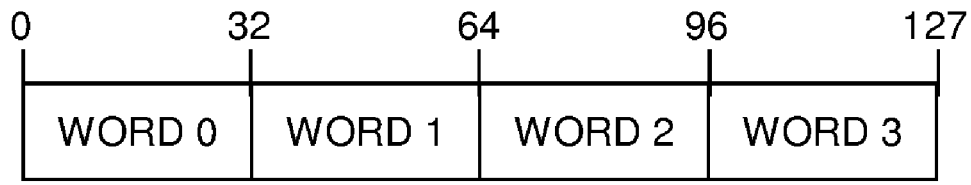
FIG. 5 illustrates a cross product operation.
FIG. 6 illustrates a register according to an embodiment of the invention.

FIG. 5 illustrates a cross product operation between two vectors A and B. As illustrated, vector A may be represented by coordinates $[x_a, y_a, z_a]$, and vector B may be represented by coordinates $[x_b, y_b, z_b]$. The cross product A×B results in a vector N that is perpendicular (normal) to a plane comprising vectors A and B. The coordinates of the normal vector, as illustrated are $[(y_a z_b - y_b z_a), (x_b z_a - x_a z_b), (x_a y_b - x_b y_a)]$. One skilled in the art will recognize that vector A may correspond to vector 411a in FIG. 4, vector B may correspond to vector 411b, and vector N may correspond to normal vector 413.

Another common vector operation performed during image processing is the dot product operation. A dot product operation may be performed to determine rotation, movement, positioning of objects in the scene, and the like. A dot product operation produces a scalar value that is independent of the coordinate system and represents an inner product of the Euclidean space. The equation below describes a dot product operation performed between the previously described vectors A and B:

$$A \cdot B = x_a \cdot x_b + y_a \cdot y_b + z_a \cdot z_b$$

Hardware Support for Performing Vector Operations

As described earlier, a vector throughput engine (VTE), for example VTE 210 in FIG. 2, may perform operations to determine whether a ray intersects with a primitive, and determine a color of a pixel through which a ray is passed. The operations performed may include a plurality of vector and scalar operations. Accordingly, VTE 210 may be configured to issue instructions to a vector unit for performing vector operations.

Vector processing may involve issuing one or more vector instructions. The vector instructions may be configured to perform operations involving one or more operands in one or more registers. The one or more registers may be a part of a register file associated with a vector unit. FIG. 6 illustrates an exemplary register 600 comprising one or more operands. As illustrated in FIG. 6, each register in the register file may comprise a plurality of sections, wherein each section comprises an operand.

In the embodiment illustrated in FIG. 6, register 600 is shown as a 128 bit register. Register 600 may be divided into four 32 bit word sections: word 0, word 1, word 2, and word 3, as illustrated. Word 0 may include bits 0-31, word 1 may include bits 32-63, word 2 may include bits 64-97, and word 3 may include bits 98-127, as illustrated. However, one skilled in the art will recognize that register 600 may be of any reasonable length and may include any number of sections of any reasonable length.

Each section in register 600 may include an operand for a vector operation. For example, register 600 may include the coordinates and data for a vector, for example vector A of FIG. 5. Accordingly, word 0 may include coordinate $x_a$, word 1 may include the coordinate $y_a$, and word 2 may include the coordinate $z_a$. Word 3 may include data related to a primitive associated with the vector, for example, color, transparency, and the like. In one embodiment, word 3 may be used to store scalar values. The scalar values may or may not be related to the vector coordinates contained in words 0-2.

Figure 7:
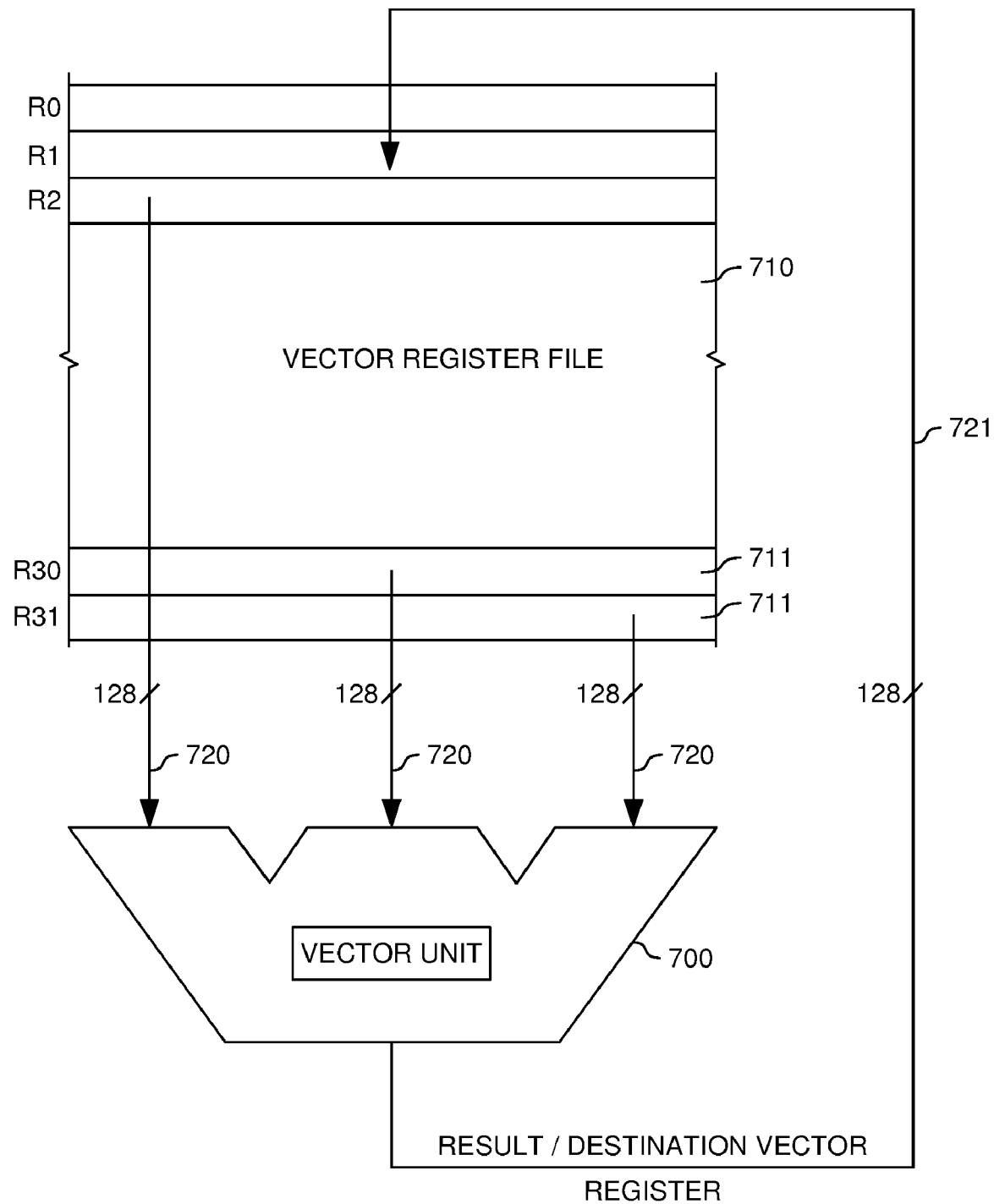
FIG. 7 illustrates a vector unit and a register file, according to an embodiment of the invention.

FIG. 7 illustrates an exemplary vector unit 700 and an associated register file 710. Vector unit 700 may be configured to execute single instruction multiple data (SIMD) instructions. In other words, vector unit 700 may operate on one or more vectors to produce a single scalar or vector result. For example, vector unit 700 may perform parallel operations on data elements that comprise one or more vectors to produce a scalar or vector result.

A plurality of vectors operated on by the vector unit may be stored in register file 710. For example, in FIG. 7, register file 710 provides 32 128-bit registers 711 (R0-R31). Each of the registers 711 may be organized in a manner similar to register 600 of FIG. 6. Accordingly, each register 711 may include vector data, for example, vector coordinates, pixel data, transparency, and the like. Data may be exchanged between register file 710 and memory, for example, cache memory, using load and store instructions. Accordingly, register file 710 may be communicably coupled with a memory device, for example, a Dynamic Random Access memory (DRAM) device and or a cache (SRAM) device.

A plurality of lanes 720 may connect register file 710 to vector unit 700. Each lane may be configured to provide input from a register file to the vector unit. For example, in FIG. 7, three 128 bit lanes connect the register file to the vector unit 700. In this manner, the contents of any 3 registers from register file 710 may be provided to the vector unit at a time.

The results of an operation performed by the vector unit may be written back to register file 710. For example, a 128 bit lane 721 provides a write back path to write results computed by vector unit 700 back to any one of the registers 711 of register file 710.

Figure 8:
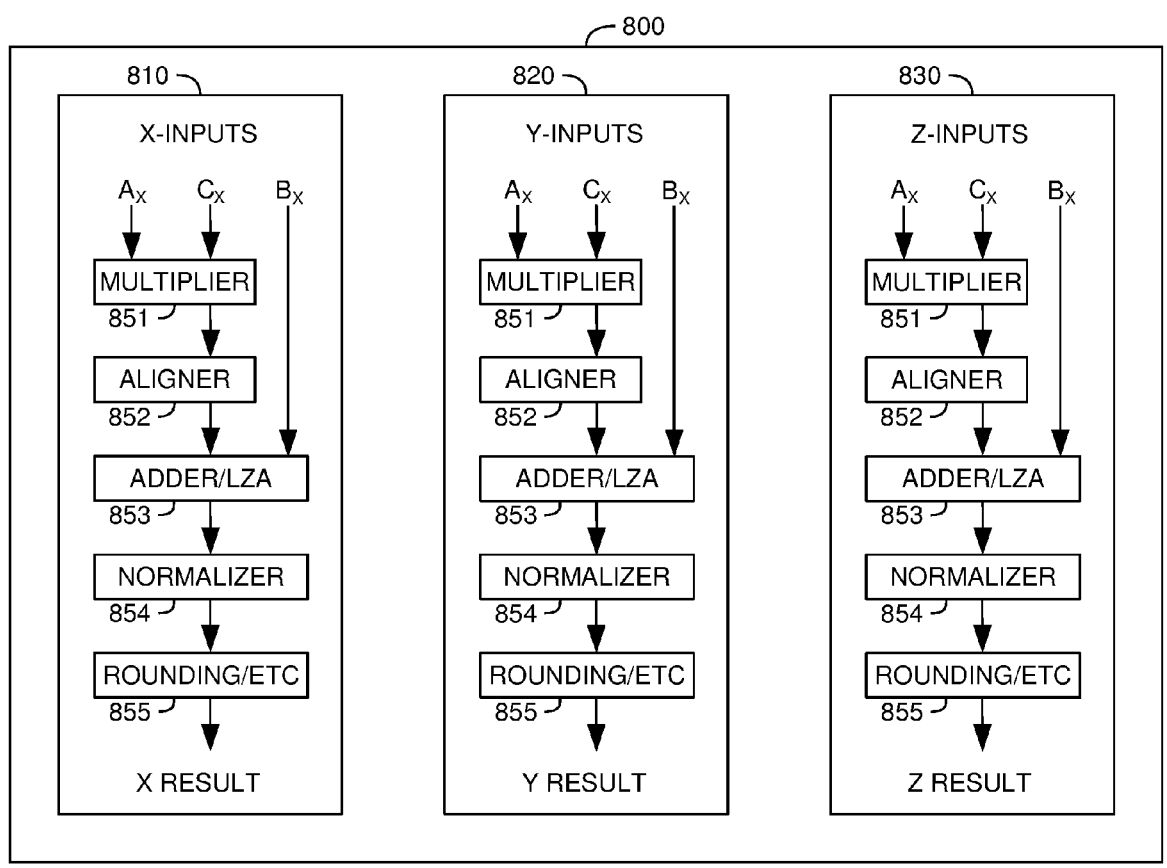
FIG. 8 illustrates a detailed view of a vector unit according to an embodiment of the invention.

FIG. 8 illustrates a detailed view of a vector unit 800. Vector unit 800 is an embodiment of the vector unit 700 depicted in FIG. 7. As illustrated in FIG. 8, vector unit 800 may include a plurality of processing lanes. For example, three processing lanes 810, 820, and 830 are shown in FIG. 8. Each processing lane may be configured to perform an operation in parallel with one or more other processing lanes. For example, each processing lane may multiply a pair of operands to perform a cross product or dot product operation. By multiplying different pairs of operands in different processing lanes of the vector unit, vector operations may be performed faster and more efficiently.

In one embodiment of the invention, one or more processing lanes of vector unit 800 may be configured to perform scalar operations. Therefore, vector unit 800 may be configured to perform both scalar and vector operations. For example, in one embodiment, vector unit 800 may include four processing lanes, wherein three processing lanes are configured to perform vector operations and one processing lane is configured to perform scalar operations.

Each processing lane may be pipelined to further improve performance. Accordingly, each processing lane may include a plurality of pipeline stages, with each stage performing one or more operations on the operands. For example, each vector lane may include a multiplier 851 for multiplying a pair of operands 830 and 831. Operands 830 and 831 may be derived from one of the lanes coupling the register file with the vector unit, for example, lanes 720 in FIG. 7. In one embodiment of the invention, the multiplication of operands may be performed in a first stage of the pipeline as illustrated in FIG. 8.

Each processing lane may also include an aligner for aligning the product computed by multiplier 851. For example, an aligner 852 may be provided in each processing lane. Aligner 852 may be configured to adjust a decimal point of the product computed by a multiplier 851 to a desirable location in the result. For example, aligner 852 may be configured to shift the bits of the product computed multiplier 851 by one or more locations, thereby putting the product in desired format. While alignment is shown as a separate pipeline stage in FIG. 8, one skilled in the art will recognize that the multiplication and alignment may be performed in the same pipeline stage.

Each processing lane may also include an adder 853 for adding two or more operands. In one embodiment (illustrated in FIG. 8), each adder 853 is configured to receive the product computed by a multiplier, and add the product to another operand 832. Operand 832, like operands 830 and 831, may be derived from one of the lanes connecting the register file to the vector unit. Therefore, each processing lane may be configured to perform a multiply-add instruction. One skilled in the art will recognize that multiply-add instructions are frequently performed in vector operations. Therefore, by performing several multiply add instructions in parallel lanes, the efficiency of vector processing may be significantly improved.

Each vector processing lane may also include a normalizing stage and a rounding stage, as illustrated in FIG. 8. Accordingly, a normalizer 854 may be provided in each processing lane. Normalizer 854 may be configured to represent a computed value in a convenient exponential format. For example, normalizer may receive the value 0.0000063 as a result of an operation. Normalizer 854 may convert the value into a more suitable exponential format, for example, $6.3 \times 10^{-6}$. The rounding stage may involve rounding a computed value to a desired number of decimal points. For example, a computed value of 10.5682349 may be rounded to 10.568 if only three decimal places are desired in the result. In one embodiment of the invention the rounder may round the least significant bits of the particular precision floating point number the rounder is designed to work with.

One skilled in the art will recognize that embodiments of the invention are not limited to the particular pipeline stages, components, and arrangement of components described above and in FIG. 8. For example, in some embodiments, aligner 852 may be configured to align operand 832, a product computed by the multiplier, or both. Furthermore, embodiments of the invention are not limited to the particular components described in FIG. 8. Any combination of the illustrated components and additional components such as, but not limited to, leading zero adders, dividers, etc. may be included in each processing lane.

In one embodiment of the invention, one or more vector units may be coupled with a register file. For example, in one embodiment, two vector units may be coupled with the register file. Each vector unit may be configured to independently and simultaneously process vector and scalar instructions. In one embodiment, one or more resources in a first vector unit may be shared with a second vector unit to process an instruction, for example, a cross product instruction.

Aligned and Misaligned Vector Data

Vector operations (e.g., cross product, dot product, etc.) have become a major workload for many graphics and scientific applications. Vectors containing vector data for use in these applications may be stored within a memory device and may be aligned along the boundaries of the memory device.

For example, FIG. 9 illustrates four vectors (A, B, C, and D) each vector containing vector data or components (x-component, y-component, and z-component) and stored within a memory array 900, such as a data cache associated with a vector unit (e.g., vector unit 700). As illustrated, the four vectors may be aligned along the boundary 905 of the memory array 900. Aligning vector data along the boundary 905 of the memory array may simplify identification of the location within memory and may allow the aligned vectors to be loaded directly into the register file of a vector unit. However, aligning memory along the boundary of the memory array may waste large amounts of memory storage space.

For example, each vector illustrated in FIG. 9 (i.e., vector A, vector B, Vector C, and vector D) may be three words long (twelve bytes long). Each vector may contain three components and each component may be one word long (four bytes long). However, each row of the memory array 900 illustrated in FIG. 9 may be sixteen bytes wide or four words long. Consequently, by aligning vector data along the boundary 905 of the memory array 900, one word or four bytes of memory storage space or memory bandwidth may go unused per row of the memory array 900. Therefore, storing four vectors each aligned along the boundary 905 of the memory array 900 may waste four words or sixteen bytes of memory bandwidth.

However, memory bandwidth or storage space may be conserved if vector data is stored misaligned within the memory array and vector data is packed into the rows of the memory array. For example, FIG. 10 illustrates a memory array (e.g., within a data cache) which contains misaligned and packed vector data. For purposes of illustration, the memory array 900 contains the same four vectors (A, B, C, and D) as illustrated in FIG. 9. However, as illustrated in FIG. 10, the four vectors are stored on three rows of the memory array by misaligning some of the vectors and packing multiple vectors on different rows of the memory array. Furthermore, as illustrated in FIG. 10 some of the vectors (i.e., vector B, vector C, and vector D) are not aligned on the boundaries of the memory array. Rather, some of the vectors may be stored such that the data which makes up the vector begins at locations other than along the boundary of the memory array. Consequently, the vectors are misaligned (not aligned along the boundaries of memory) and packed into the memory array resulting in portions of more than one vector stored on a single row of the memory array.

For example, vector A is stored within the first three words (twelve bytes) of the first row in the memory array. Since vector A does not span the entire row of the memory array, a portion (e.g., one word or four bytes) of vector B is also stored on the first row of the memory array in the word immediately following vector A. Thus, vector B is not aligned along the boundary 905 of the memory array 900. The remaining portion of vector B is stored in the second row of the memory array. A portion of vector C is stored on the second row of the memory array and another portion of vector C is stored on the third row of the memory array. Lastly, vector D is stored on the third row of the memory array. By misaligning and packing the vector data which makes up the four vectors into the memory array, the entire fourth row or sixteen bytes of the memory bandwidth were conserved.

Although misaligning and packing vector data into a memory array may increase memory bandwidth, misaligning and packing vectors in a memory array poses a problem for a processing unit (e.g., vector unit 700) which outputs aligned vector data into a vector register file. A processing unit which outputs aligned vector data into a vector register file may need to misalign vector data before the vector data is stored to a memory array containing misaligned vector data.

Misaligning vector data may be accomplished through the use of temporary registers and special processing instructions (e.g., permutes) within the vector unit. However, requiring temporary registers to misalign vector data (vector components) may prevent other operations from using the temporary registers and/or may require an increased number of temporary registers within the processor. Furthermore, the additional processing instructions may require a significant amount of processor cycles to perform and may cause stalls in the vector unit pipeline. The use of temporary registers, wasted processing cycles, and an increased number of stalls in the vector unit pipeline may reduce the performance of the processor.

Store Misaligned Vector with Permute

Embodiments of the invention may reduce the processor workload required to store misaligned vector data by misaligning vector data as it is being stored to memory. By misaligning vector data as it is being stored to memory, embodiments of the invention eliminate the need to misalign the vector data using temporary registers and special processing instructions (e.g., permutes) within the vector unit. Furthermore, by misaligning vector data as it is being stored to memory, embodiments of the invention may reduce the number of pipeline stalls in comparison to misaligning vector data before the vector data is stored to memory through the use of temporary registers and special processing instructions.

According to one embodiment of the invention, portions of a vector may be permuted or rearranged in order to misaligned the vector data as it is being stored to memory through the use of a store permute unit. A store permute unit may be located in the store data path between a vector register file and a memory array (e.g., a data cache). The store permute unit may be configured to misalign the vector data within the vector register file as it passes from the vector register file and into the memory array. As described further below, logic within the store permute unit (e.g., multiplexers) may be configured to misalign vector data by writing to a store permute control (SPC) register. Furthermore, according to embodiments of the invention, a unique store-misaligned-vector instruction may cause vector data within a vector register file or vector register files to be passed through the store permute unit and, consequently, misaligned as the vector data is stored to memory.

Figure 11:
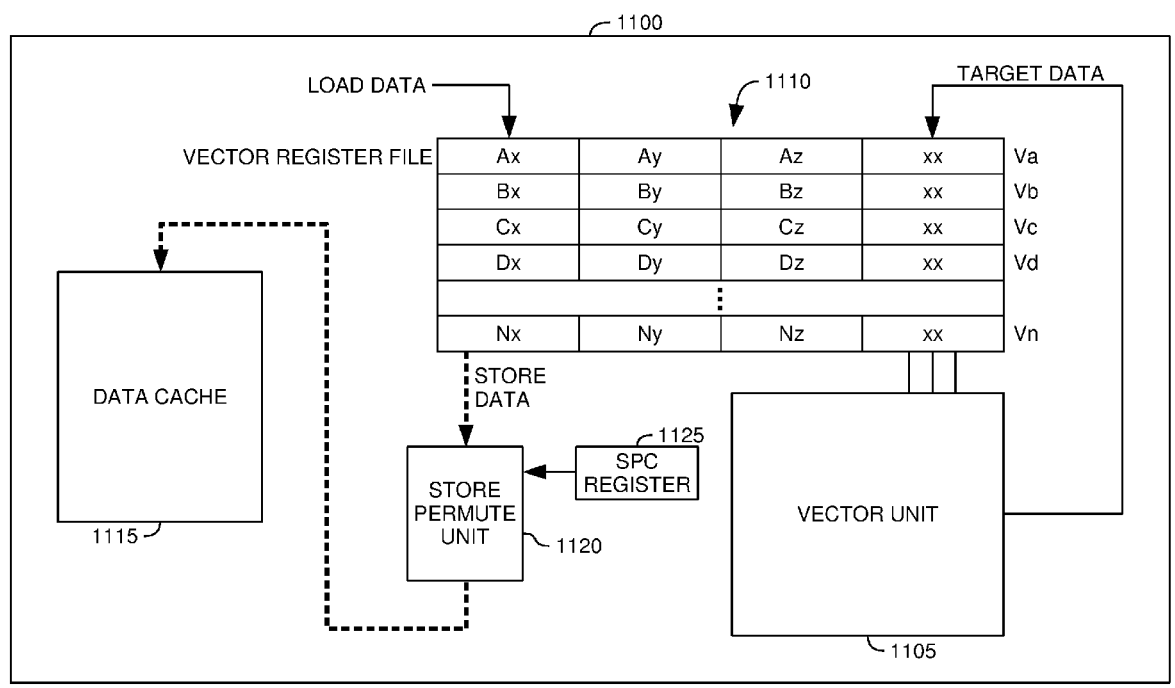
FIGS. 11 and 16 illustrate exemplary vector processors according to embodiments of the invention.

FIG. 11 illustrates an exemplary system 1100 which may store vector-data misaligned, according to embodiments of the invention. The exemplary system may reside within, for example, a multi-core processor 102 illustrated in FIG. 1.

As illustrated in FIG. 11, the system 1100 may include a vector unit 1105 and a vector register file 1110. The vector unit 1105 and the vector register file 1110 may be similar to the vector unit 700 and the vector register file 710 described above with respect to FIG. 7. As illustrated the vector register file 1110 may contain a plurality of vector registers $V_A$-$V_N$, and each vector register may contain vector data. For example, vector registers $V_A$-$V_D$ illustrated in FIG. 11 may contain vector A, vector B, vector C and vector D. For purposes of illustration only, the vector registers illustrated in FIG. 11 are four words or 128 bits wide. However, embodiments of the invention may use registers of any width.

The system 1100 may also include a data cache 1115 for storing misaligned vector data. As described further below, the exemplary system 1100 may be configured to misalign vector data as it is stored to the data cache 1115. A store permute unit 1120 is also illustrated in FIG. 11, and the store permute unit 1120 may contain logic which may be configured to misalign vector data as it is stored to memory (e.g., the data cache 1115). In order to misalign vector data as it is stored to memory, the store permute unit 1120 may be located in the store data path (illustrated in FIG. 11 by a dashed line) between the vector register file 1110 and the data cache 1115. The system 1100 illustrated in FIG. 11 also includes a store-permute-control (SPC) register 1125. An SPC register may include a plurality of bits coupled to logic within the store permute unit 1120. As described further below, the bits within the SPC register may configure the logic within the store permute unit 1120 to misalign vector data as it is stored to memory.

Figure 12:
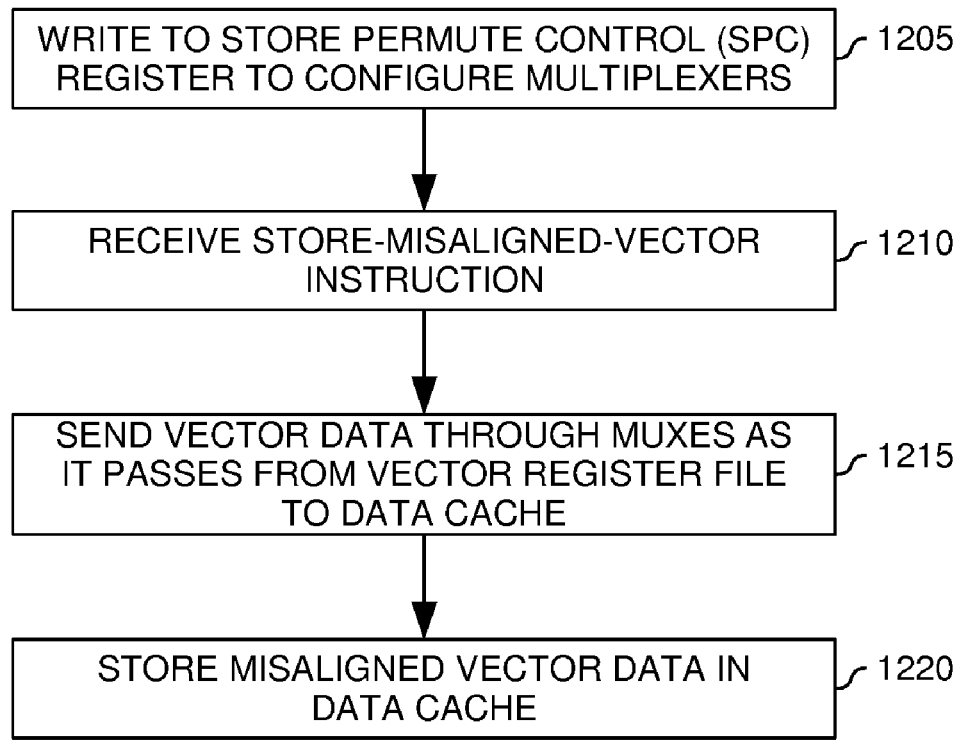
FIG. 12 is a flowchart which illustrates an exemplary method of storing vector data misaligned, according to an embodiment of the invention.

FIG. 12 is a flowchart which illustrates an exemplary method of misaligning vector data as it is stored to memory, according to embodiments of the invention. The method begins at step 1205 when an instruction to write to the store permute control (SPC) register is executed or received by a vector processor.

Figure 13:
FIG. 13 illustrates an exemplary store permute control register according to an embodiment of the invention.

FIG. 13 illustrates an exemplary SPC register 1305 containing a plurality of bits. Each of the bits in the SPC register may be electrically connected to or electrically coupled to the select inputs of one or more multiplexers within the store permute unit 1120. Consequently, the bits in the SPC register may be used to configure the one or more multiplexers within the store permute unit. As illustrated in FIG. 13 the SPC register may be divided into four portions (SPC(0:2), SPC(3:5), SPC(6:8) and SPC(9:11)), each portion of the SPC register containing three bits. According to one embodiment of the invention, each portion of bits may be used to configure a different multiplexer within the store permute unit 1120. However, according to other embodiments of the invention, an SPC register may contain more or less bits to configure more or less multiplexers within the store permute register 1120.

Figure 14:
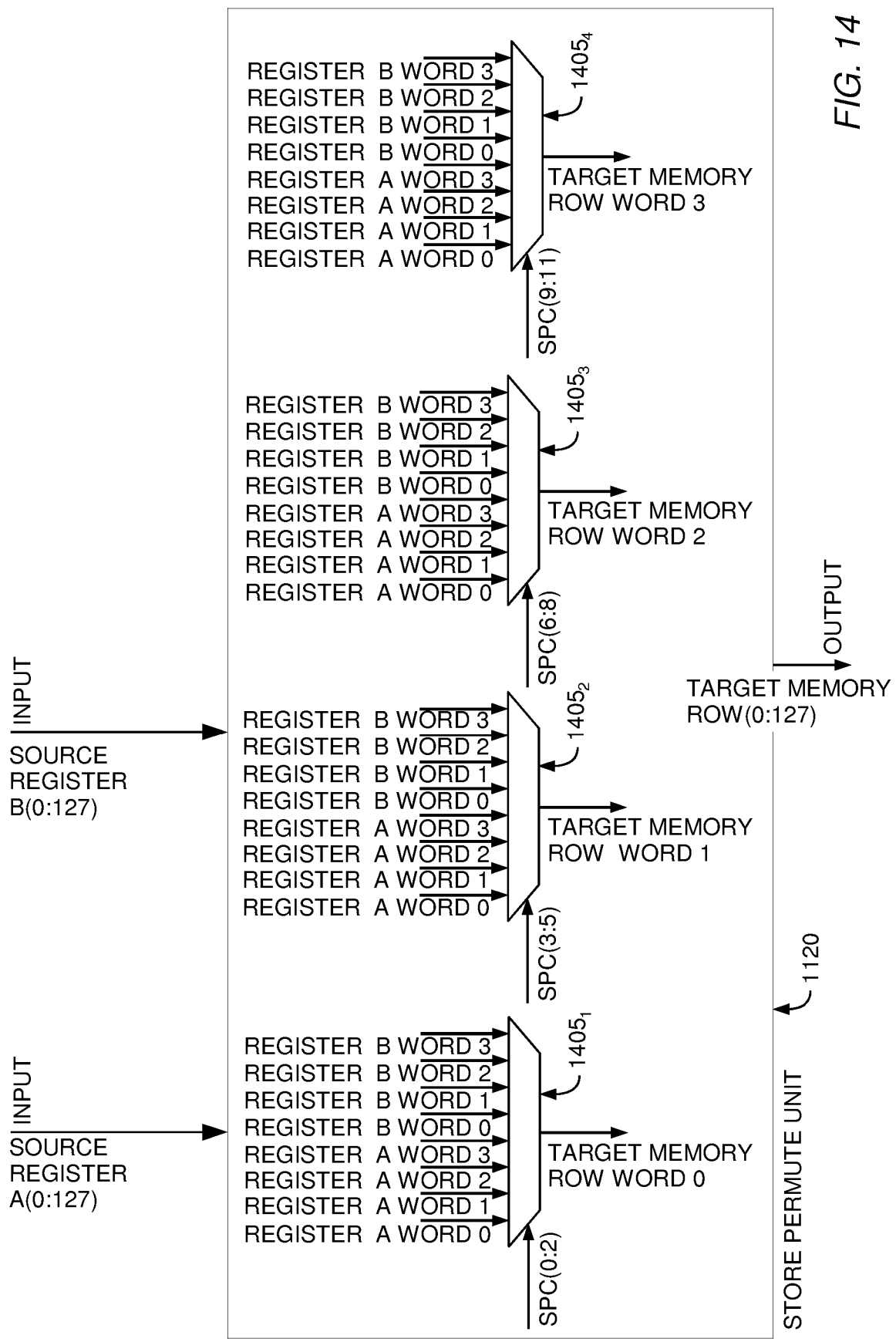
FIG. 14 illustrates an exemplary store permute unit according to an embodiment of the invention.

FIG. 14 illustrates an exemplary store permute unit 1120 containing a plurality of multiplexers, according to one embodiment of the invention. For purposes of illustration, a single row of memory may contain vector data from two distinct vectors and, consequently, the input to the store permute unit 1120 may be from two vector registers containing vector data of two distinct vectors. However, according to other embodiments of the invention, each row of memory may contain vector data from more than two vectors and, consequently, the input to the store permute unit 1120 may be from more than two vector registers.

As illustrated in FIG. 14, the store permute unit may receive as input vector data from two source vector register files, register A and register B, within the vector register file 1110. Each of the vector registers input to the store permute unit 1120 may contain four words of data (128 bits of data). According to one embodiment of the invention, four multiplexers ($1405_{1-4}$) may be used to direct vector data from each vector register file word locations in the target row of the memory array. Each of the multiplexers may select a single word from the two vector registers to output to a single word in the resulting row of the memory array. In order for each multiplexer to distinctly identify each word value from the two vector registers three bits (a single portion of the SPC register) may be required to configure each multiplexer. Consequently, the SPC register may contain twelve bits. If, however, a finer level of granularity is desired, the SPC may require a larger number of bits.

Returning to method 1200, after writing a configuration value to the SPC register, at step 1210 of method 1200 the multiplexers may be configured to misalign vector data according to the SPC register value. Next, at step 1215 a store-misaligned-vector instruction may be received or executed by the processor. The store misaligned vector instruction may specify the source vector registers within the register file which contain the vector data which is to be written to the memory array and, consequently, are used as the input vectors to the store permute unit 1120. The store-misaligned-vector instruction may also identify the target memory address or memory row within the memory array where the resulting misaligned vector data may be stored.

Figure 15:
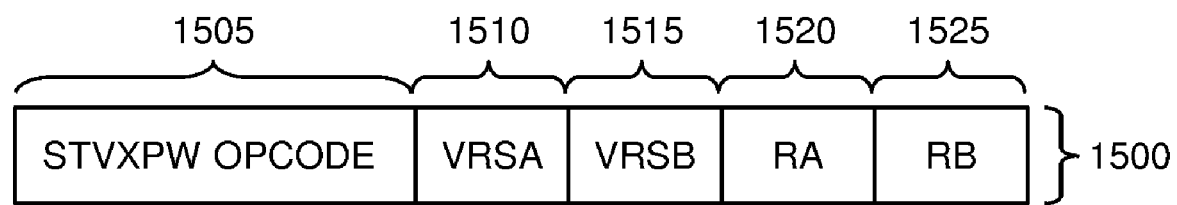
FIG. 15 illustrates an exemplary store-misaligned-vector instruction, according to an embodiment of the invention.

FIG. 15 illustrates an exemplary store-misaligned-vector instruction 1500. As illustrated in FIG. 15, the first portion of the store misaligned vector instruction may be an opcode field 1505. The opcode field 1505 may contain information such that processor controller logic may identify the instruction as a store-misaligned-vector instruction.

The store-misaligned-vector instruction 1500 may also include a first source vector register field (VRSA) 1510 and a second source vector register field (VSRB) 1515 in order to identify the source vector registers within the vector register file. The source vector register fields (VSRA and VSRB) may identify the vector registers within the vector register file which contain data which may form a portion of the memory row which is to be written to memory. The store-misaligned-vector instruction may also include a first target memory address 1520 and a second target memory address 1525 in order to identify the target row within memory. The first target memory address 1520 and the second target memory address 1525 may identify target memory addresses or rows where the misaligned vector data may be stored within memory.

After receiving the store misaligned vector instruction, at step 1220 of method 1200, the processor may send the vector data from the source vector registers through the store permute unit 1120. By sending the vector data through the store permute unit the vector data is thereby misaligning according to the configuration of the logic (e.g., multiplexers) within the store permute unit. The misaligned vector data may then be stored in a row of the memory array specified by the target memory address specified in the store misaligned vector instruction. Thus, a row of memory may be written with misaligned vector data. Consequently, vector data may be misaligned as it is written to memory and the memory array may be packed with misaligned vector data.

Exemplary Use of Store Misaligned Vector with Permute Instruction

An example of misaligning vector data as it is stored to memory is now described. Table 1 lists a series of assembly language instructions or assembly code which causes vector data within vector registers to be misaligned and stored to memory.

TABLE 1

Exemplary Use of Store Misaligned Vector Instructions

```
01 # Store misaligned vectors, Ra = 0x000.
02 setspc 84           # Set SPC 000 001 010 100
03 stvxpw Va,Vb,0,Ra   # Store to 0x000
04 addi Ra,Ra,16
05 setspc 1253         # Set SPC 010 011 100 101
06 stvxpw Vb,Vc,0,Ra   # Store to 0x010
07 addi Ra,Ra,16
08 setspc 1838         # Set SPC 011 100 101 110
09 stvxpw Vc,Vd,0,Ra   # Store to 0x020
```

As indicated by the commented first line of code (01), a register within the processor (Ra) may contain a first value of 0x000. This value may be used in later instructions as a target memory address. The second line of the code (02) may write a decimal value of 84 to an SPC register. As described further below, writing the decimal value of 84 to the SPC register configures the multiplexers within the store permute unit 1120 may be configured to misalign vector data as it passes from vector registers within the vector register file 1110 to the data cache 1115.

The third line of code (03) is an exemplary store-misaligned-vector instruction. The store misaligned vector instruction in the third line of the code (03) causes vector data within a first vector register (Va), and the vector data within a second vector register (Vb) to be sent through the multiplexers within the store permute unit 1120. The store misaligned vector instruction also causes the data output from the store permute unit 1120 to be stored in the data cache 1115 at the address specified by the register Ra (0x000).

For example, if the vector data within vector registers Va and Vb is as illustrated in FIG. 11, then an SPC register value of 84 may configure the multiplexers illustrated in FIG. 14 such that the execution of the stvxpw instruction may cause the first three words of vector A (i.e., Ax, Ay, and Az) to be stored in the first three words of the memory row beginning at memory address 0x000, and the first word of vector B (i.e., Bx) to be stored in the last word of the memory row beginning at memory address 0x000. Consequently, the row of memory at memory address 0x000 may contain vector data as illustrated in FIG. 10.

The fourth line of assembly code (04) in Table 1 adds the decimal value 16 to the value stored within the register Ra (0x000) and stores the result (0x010) in Ra. By adding a decimal value of 16 to the value stored within register Ra (0x000) and storing the result (0x010) in the Ra register, the instruction increments the value of Ra such that a future execution of the store misaligned vector instruction which uses the new Ra value as the target address may write the results of the store instruction to the next row of memory.

The fifth line of code (05) writes a decimal value of 1253 to the SPC register. Writing the decimal value 1253 to the SPC register, may configure the multiplexers within the store permute unit 1120 to misalign vector data as it passes from a vector register within the vector register file 1110 to the data cache 1115.

The sixth line of code (06) is a store-misaligned-vector instruction. The store-misaligned-vector instruction in the sixth line of the code causes the vector data within the second vector register (Vb), and the vector data within a third vector register (Vc) to be sent through the multiplexers within the store permute unit 1120. The store misaligned vector instruction also causes the data output from the store permute unit 1120 to be stored in the data cache 1115 at the address specified by the register Ra (0x010).

For example, if the vector data within vector registers Vb and Vc is as illustrated in FIG. 11, then an SPC value of 1253 may configure the multiplexers illustrated in FIG. 14 such that the execution of the stvxpw instruction causes the last two words of vector B (i.e., By and Bz) to be written to the first two words of the row of memory at memory address 0x010, and the first two words of vector C (i.e., Cx and Cy) to be written to the last two words of the row of memory at memory address 0x010. Consequently, the row of memory at memory address 0x010 may contain vector data as illustrated in FIG. 10.

The seventh line of the assembly code (07) in Table 1 adds the decimal value 16 to the value stored within the register Ra (0x010) and stores the result (0x020) in the register Ra. By adding a decimal value of 16 to the value stored within register Ra, an application may increment the value of Ra such that a future execution of the store misaligned vector instruction which uses the Ra value as the target address may write the results of the store instruction to the next row of memory.

The eighth line of code (08) writes a decimal value of 1838 to the SPC register. Writing the decimal value 1838 to the SPC register may configure the multiplexers within the store permute unit 1120 to misalign vector data as it passes from a vector register within the vector register file 1110 to the data cache 1115.

The ninth line of code (09) is a store-misaligned-vector instruction. The store misaligned vector instruction in the ninth line of the code causes the vector data within the third vector register (Vc), and the vector data within a fourth vector register (Vd) to be sent through the multiplexers within the store permute unit 1120. The store misaligned vector instruction also causes the data output from the store permute unit 1120 to be stored in the data cache 1115 at the address specified by the register Ra (0x020).

For example, if the vector data within vector registers Vc and Vd is as illustrated in FIG. 11, then an SPC value of 1838 may configure the multiplexers illustrated in FIG. 14 such that the execution of the stvxpw instruction causes the last word of vector C (i.e., Cz) to be written to the first word of the row of memory at memory address specified by the register Ra (i.e., 0x020), and the three words of vector D (i.e., Dx, Dy, and Cz) to be written to the last three words of the row of memory at memory address 0x020. Consequently, the row of memory at memory address 0x020 may contain vector data as illustrated in FIG. 10.

Therefore, by using logic within the store data path, a store permute control register which configures the logic, and a unique store-misaligned-vector instruction, embodiments of the invention may enable misaligned vector data to be stored to memory without having to perform operations (e.g., execute permute instructions) to misalign the vector data before storing the vector data to memory. By storing vector data misaligned directly to memory without the need to perform operations within the vector unit to misalign the vector data, the overall performance of the processor may be improved.

Load Misaligned Vector Data with Permute and Mask Insert

Although misaligning and packing vector data into a memory array may increase memory bandwidth, misaligning and packing vectors in a memory array poses a problem for a vector unit (e.g., vector unit 700) which performs operations on aligned vector data located in vector registers. Specifically, a vector unit which performs operations on aligned vector data may need to align the misaligned-vector data before the vector data is used in vector unit operations.

Aligning misaligned-vector data may be accomplished by first loading the misaligned vector data into vector registers and then aligning the vector data within the vector unit using temporary registers and special processing instructions (e.g., permute instructions). However, requiring temporary registers to align vector data may prevent other operations from using the temporary registers, and the additional processing instructions may require a significant amount of time and processor cycles to perform. Furthermore, the additional processing instructions (e.g., permute instructions) may cause stalls in the pipeline of the vector unit. The use of temporary registers, wasted processing cycles, and increased number of stalls in the vector unit pipeline may reduce the performance of the processor.

However, according to embodiments of the invention, vector data may be permuted (rotated or rearranged) in order to align the data as it is loaded from memory into the vector register files. In contrast to aligning vector data after it has been loaded into a vector register, aligning vector data as it is loaded from memory eliminates the need to realign vector data through the used of instructions and processing steps within the vector unit may be eliminated.

According to embodiments of the invention, vector data may be aligned as it is loaded from memory through the use of load permute logic located in the load data path from a memory array to the vector register file. The load permute logic may be configured, through the use of an LPC register, to align the misaligned-vector data as it is loaded from memory.

Figure 16:
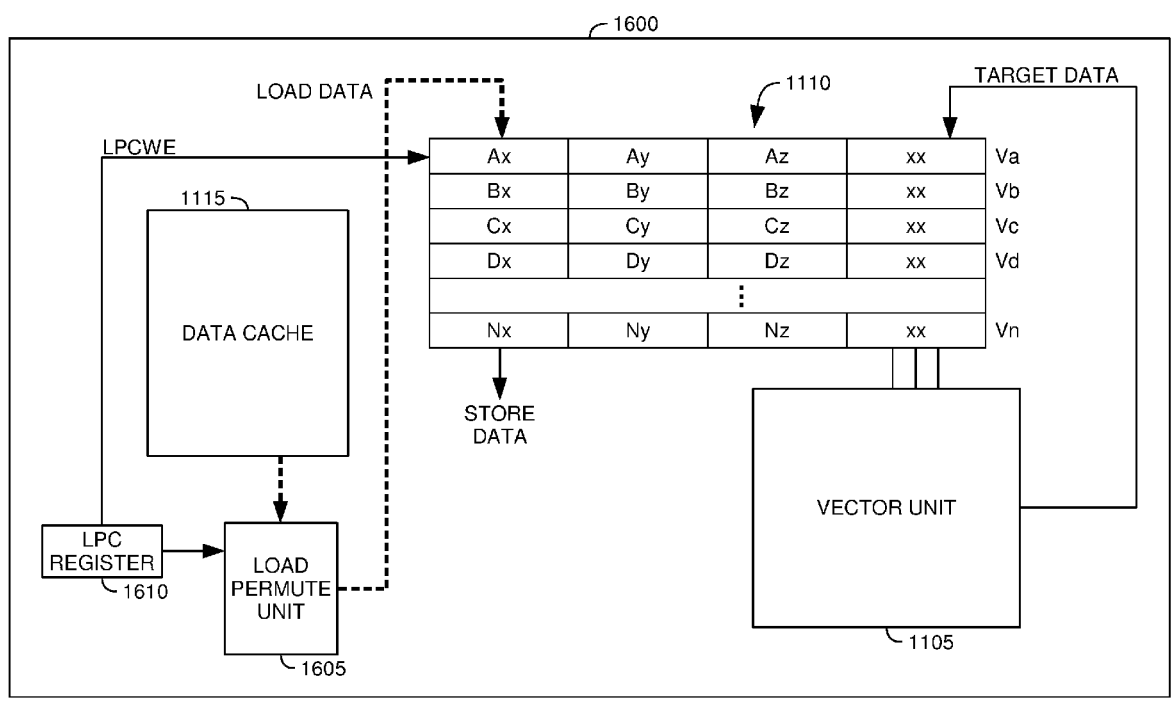

FIG. 16 illustrates an exemplary system 1600 which may align misaligned-vector data as it is loaded from memory into a vector register, according to embodiments of the invention. The system 1600 illustrated in FIG. 16 is similar to the system 1100 illustrated in FIG. 11. However, FIG. 16 illustrates a load data path (dashed line) from the data cache 1115 to the vector register file 1110. FIG. 16 also illustrates an exemplary load permute unit 1605 in the load data path. The load permute unit 1605 may contain logic configured to align vector data as it is loaded from the data cache 1115 into the vector register file 1110.

The system 1600 illustrated in FIG. 16 also includes a load-permute-control (LPC) register 1610. An LPC register may include a plurality of bits coupled to logic within the load permute unit 1605 register file 1110. As described further below, the bits within the LPC register may configure the logic within the load permute unit 1605 to misalign vector data as it is loaded from memory and may mask data as it is written into a vector register. The LPC register may also contain bits connected or coupled to write enables of vector registers within the vector register file. As described further below, the bits connected or coupled to write enables of the vector registers may mask (e.g., prevent) vector data as it is written to portions of a vector register.

Figure 17:
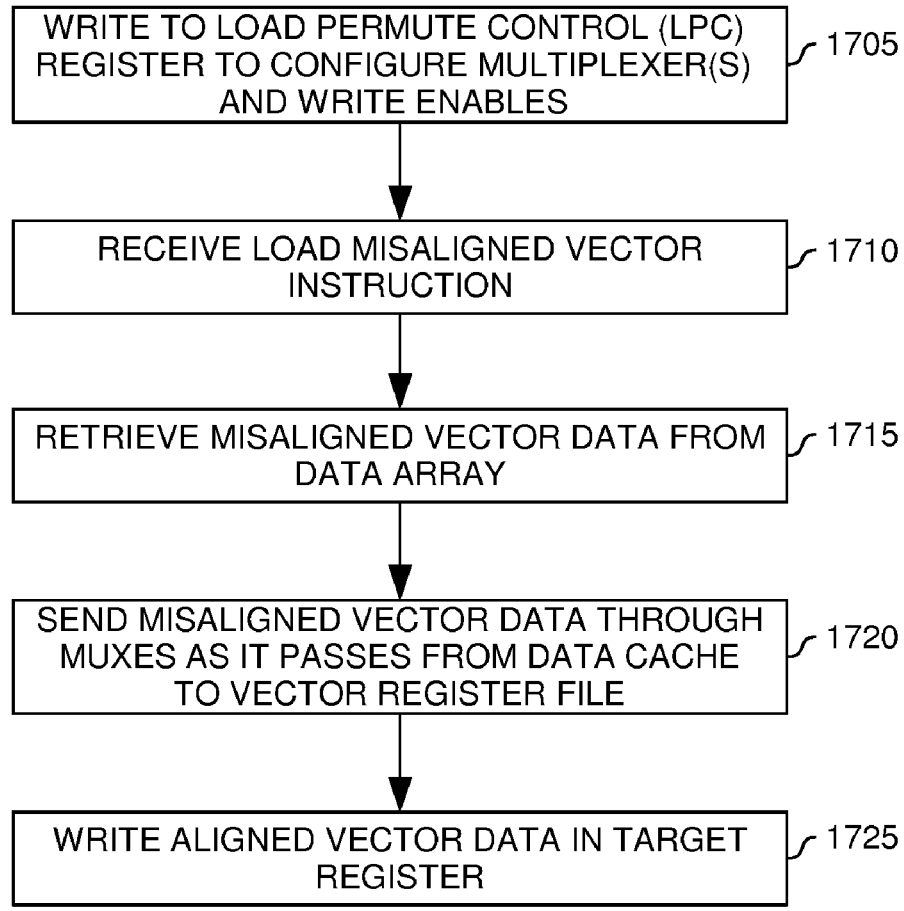
FIG. 17 is a flowchart which illustrates an exemplary method of loading misaligned vector data, according to an embodiment of the invention.

FIG. 17 illustrates an exemplary method 1700 of aligning vector data as the vector data is loaded from memory into a vector register file, according to one embodiment of the invention. The method begins at step 1705 when an instruction to write to load permute control (LPC) register is executed.

An LPC register may be a register within the system 1600 containing a plurality of bits. A portion of the bits in the LPC register may be connected or coupled, via an electrical connection, to logic within the load permute unit. For example, the bits in the LPC register maybe coupled to one or more multiplexers within the load permute unit 1605. Consequently, the bits in the LPC may be used to configure the one or more multiplexers in the load permute unit. The multiplexers within the load permute unit may be used to algin misaligned-vector data as it passes from a memory array to a vector register.

Figure 18:
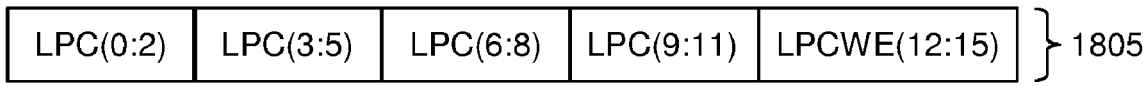
FIG. 18 illustrates an exemplary load permute control register, according to embodiments of the invention.

FIG. 18 illustrates an exemplary LPC register 1800 containing a plurality of bits, according to one embodiment of the invention. The LPC register 1805 illustrated in FIG. 18 contains twelve bits (LPC 0:11) which may be connected to or coupled to one or more multiplexers. These twelve bits (LPC 0:11) within the LPC register may be divided into four portions (0:2, 3:5, 6:8 and 9:11). Each portion may be used to configure a different multiplexer within the load permute unit 1605.

According to embodiments of the invention, another portion of the LPC register may contain a plurality of bits connected or coupled, via an electrical connection, to write enables of registers within a vector register file. For example, the LPC register 1805 illustrated in FIG. 18 contains four bits LPCWE (12:15) which may be coupled to write enables of vector registers within a vector register file. The LPC bits coupled to the write enables may be used to mask or prevent portions of vector data from being written to a vector register.

The mask bits may specify one or more locations within a target vector register in which data may be stored. For example, in one embodiment, mask field may identify a word location, where vector data may be stored. In one embodiment, the mask bits may include a single bit for each identifiable field in the target register. For example, in one embodiment, the mask field may include four bits to identify four word locations. For example, a first bit may be associated with a first word location, a second bit with a second word location, a third bit with a third word location, and a fourth bit with a fourth word location.

Accordingly, if a mask bit is enabled, the data may be written to the word location associated with the bit. For example, in one embodiment, the mask may be set to 0001, wherein logic '0' may denote a disabled bit and logic '1' may denote an enabled bit. Because the fourth logic bit is enabled, results may be written to word 3 of the target register. If, instead, the mask bit was set to '1111', the results may be written to all word locations in the target register. One skilled in the art will recognize that the enablement logic may be reversed, wherein logic '0' denotes an enabled bit and logic '1' denotes a disabled bit.

One skilled in the art will further recognize that while a mask containing four bits is described herein, embodiments of the invention are not limited as such. More generally, any number of mask bits may be used to specify any number of locations within the target register. For example, eight mask bits may be used to identify eight half word locations or sixteen mask bits to specify sixteen byte locations.

Figure 19:
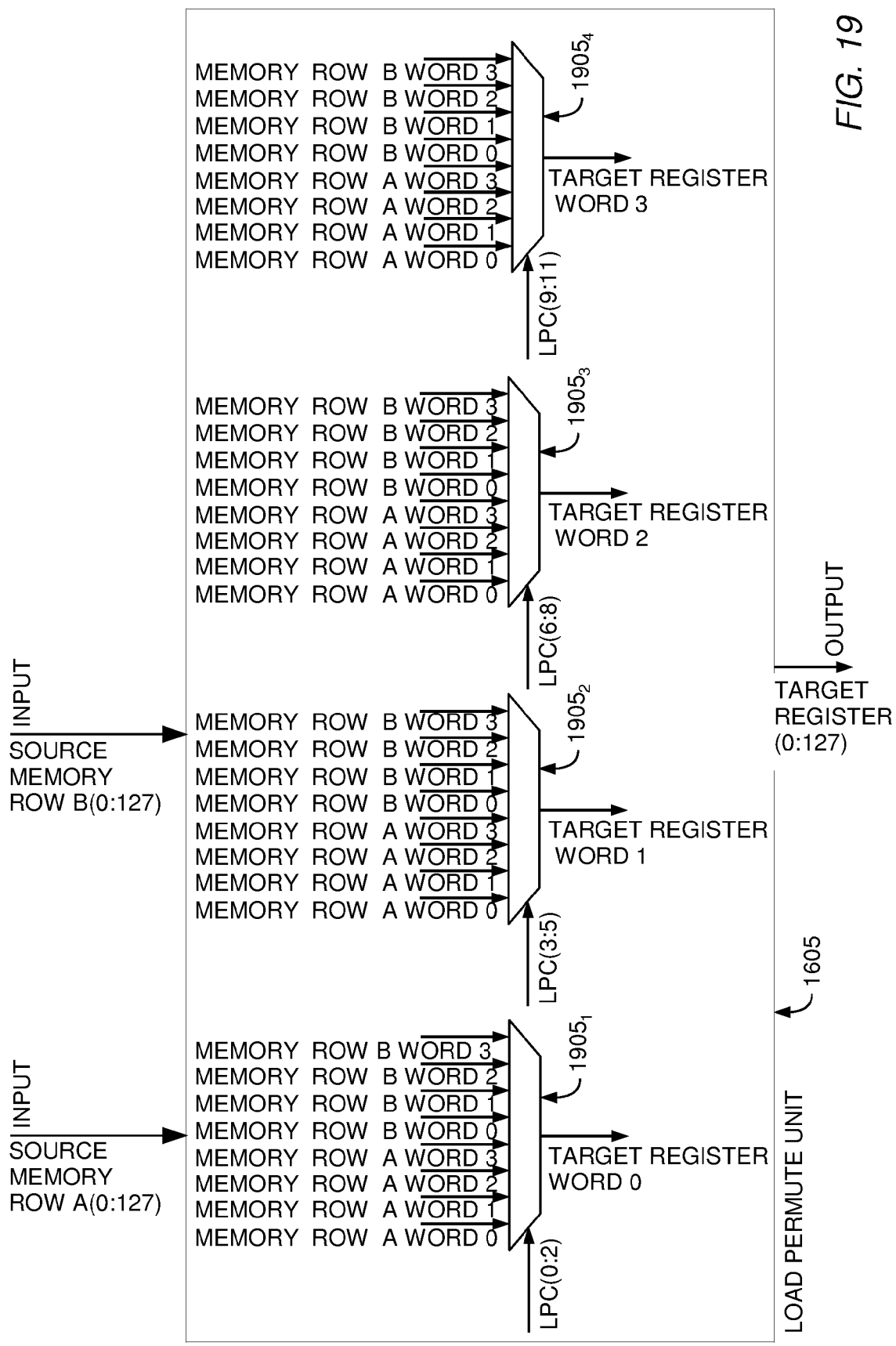
FIG. 19 illustrates an exemplary load permute unit, according to embodiments of the invention.

FIG. 19 illustrates an exemplary load permute unit 1605 containing a plurality of multiplexers. As illustrated, bits from the LPC register are connected to the configuration or select inputs of four multiplexers ($1905_{1-4}$). As illustrated in FIG. 19, the load permute unit 1605 may have as input data from two rows of a memory array (e.g., a data cache). The load permute unit 1605 may have two memory rows as inputs because a vector which is misaligned in memory may be located or stored in two separate rows of the memory array. FIG. 19 also illustrates a single output to a vector register file from the load permute unit 1605.

Returning to method 1700, after a value has been written to the LPC register, at step 1710 a load-misaligned-vector instruction may be executed. The load-misaligned-vector instruction may specify the source memory row or rows within the memory array which contain the misaligned vector data which is to be written into a vector register. The load-misaligned-vector instruction may also identify the target vector register or registers within the vector register file where the resulting aligned vector data may be stored.

Figure 20:
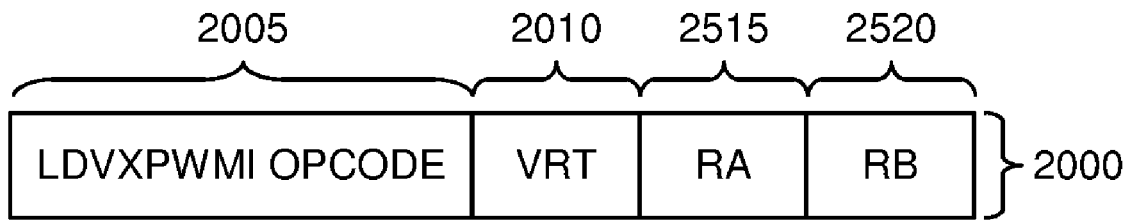
FIGS. 20 and 21 illustrate exemplary load-misaligned-vector instructions, according to an embodiment of the invention.

FIG. 20 illustrates an exemplary load-misaligned-vector instruction 2000, according to one embodiment of the invention. As illustrated in FIG. 20, the first portion of the load-misaligned-vector instruction may be an opcode field 2005. The opcode field 2005 may be configured such that processor controller logic may identify an instruction as a load-misaligned-vector instruction.

The load-misaligned-vector instruction 2000 may also include a first source memory address field (RA) 2015 and a second source memory address field (RB) 2020 in order to identify the source memory row or rows which contain the misaligned vector data. The source memory address fields (RA and RB) may identify the location of misaligned vector data within a memory array which is to be written to a target vector register. In addition of the source memory addresses, the load-misaligned-vector 2000 instruction may contain a target vector register 2010 field. The target vector register 2010 field may contain information which identifies the target register within the vector register file where the aligned vector data will be written.

Next, at step 1715 of method 1700, vector data may be retrieved from the memory array. The vector data may be retrieved from the memory rows specified in the first source memory address filed and the second source memory address field of the load-misaligned-vector instruction.

Then, at step 1720, the vector data retrieved from the memory rows may be sent through the load permute unit. For example, the vector data may be retrieved from memory and may pass through multiplexers within the load permute unit illustrated in FIG. 19. Consequently, the load permute unit may thereby align the misaligned vector data according to the configuration of the multiplexers. The multiplexers being previously configured based on the value written to the LPC register in step 1705.

Next, at step 1725 the aligned vector data may be written into the target vector register specified in the load-misaligned-vector instruction. The aligned vector data may be written to a portion or portions of the target vector register which have their corresponding write enables enabled (e.g., an unmasked portion of the vector register) according to the data value which was written to the LPCWE portion of the LPC register. Masking vector data may be desirable when, for example, a vector which is to be written into the vector register only contains three words of data. The LPCWE bits may then be used to mask the last word of data from being written into the vector register.

By writing to the LPC register to configure load-permute-unit, aligning the misaligned vector data as it passes through the load-permute-unit, and masking the vector data which does not need to be written into the vector register, embodiments of the invention may align vector data which is stored misaligned within a memory array. Furthermore, embodiments of the invention allow vector data to be aligned without using temporary registers or permute instructions and without creating stalls within the vector unit.

According to another embodiment of the invention, in contrast to configuring a LPC register prior to executing the load-misaligned-vector instruction, logic within the load-permute unit may align vector data and mask vector data based on a memory address indicating where the misaligned vector data is stored in memory.

According to one embodiment of the invention, logic in the data path may align vector data and mask vector data based on the address of the misaligned vector data through the use of a rotate-and-mask table. The logic may compare the address of the misaligned vector data to the rotate-and-mask table which may be stored within the load permute unit. The rotate-and-mask table may indicate how much misaligned vector data from memory may need to be rotated or shifted in order to align the vector data. Additionally, the rotate-and-mask table may indicate which portions of the misaligned vector data or other data on the same row of memory which may need to be masked when the vector data is written to a target vector register.

Figure 21:
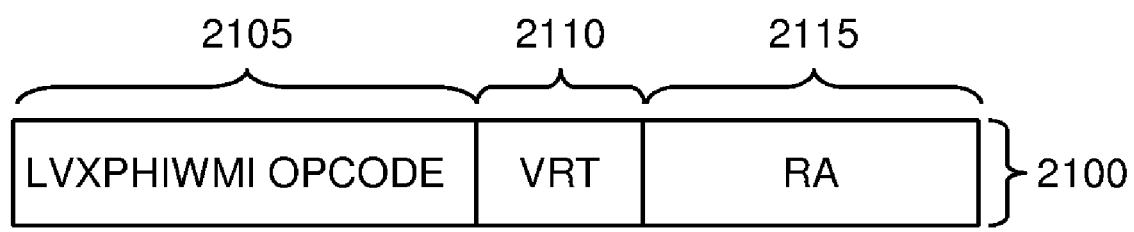
Figure 21:
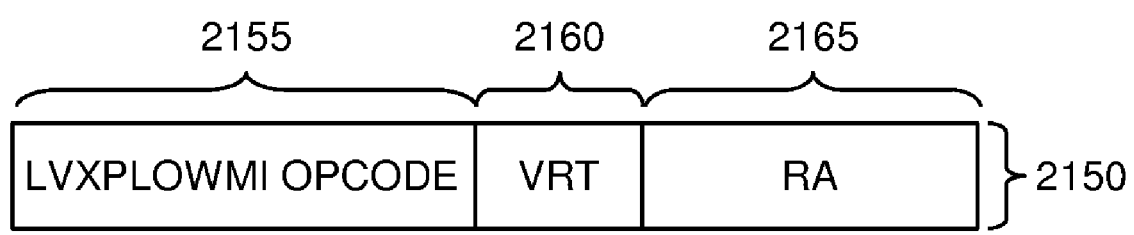

Two exemplary instructions which may be used in order to use the address of the misaligned vector data to align the vector data are illustrated in FIG. 21. Embodiments of the invention may use two unique load-misaligned-vector instructions because the vector data for a single vector may span two rows of the memory array. According to embodiments of the invention, a first load-misaligned-vector instruction may load the high or more significant portion of a misaligned vector. This first load-misaligned-vector instruction may be referred to as the load-high-misaligned-vector instruction. An exemplary load-high-misaligned-vector instruction 2100 is illustrated in FIG. 21. A second load-misaligned-vector instruction may load the low or less significant portion of misaligned vector, and may be referred to as the load-low-misaligned-vector instruction. An exemplary load-low-misaligned-vector instruction 2150 is also illustrated in FIG. 21.

As illustrated the load-high-misaligned-vector instruction 2100 may have an opcode field 2105 which may identify the load-high-misaligned-vector instruction when it is received by a vector processing unit. The load-high-misaligned-vector instruction 2100 may also contain a target vector register field 2110 which identifies the vector register where the aligned vector data is to be written. The load-high-misaligned-vector instruction 2100 may also contain a memory address field 2115 which may identify the memory address of the vector data which is stored misaligned within the memory array.

As illustrated in FIG. 21 the load-low-misaligned-vector instruction 2150 may have an opcode field 2155 which may identify the load-low-misaligned-vector instruction when it is received by a vector processing unit. Similar to the load-high-misaligned-vector instruction 2100, the load-low-misaligned-vector instruction 2150 may contain a target vector register field 2160 and a memory address field 2165.

According to embodiments of the invention, execution of the load-high-misaligned-vector instruction or the load-low-misaligned-vector instruction may cause the load permute unit to compare the source memory address specified within the instruction to a rotate-and-mask table within the load-permute-unit.

An exemplary rotate-and-mask table 2200 is illustrated in FIG. 22, according to embodiments of the invention. For purposes of illustration, the rotate-and-mask table 2200 illustrated in FIG. 22 is constructed assuming the vector data is misaligned according to a word level of granularity. However, other embodiments of the invention may use a rotate-and-mask table constructed according to a different level of granularity.

As illustrated in FIG. 22, the rotate-and-mask table 2200 contains a plurality of columns and a plurality of rows. The first or left most column of the rotate-and-mask table 2200 contains a listing of the least significant byte of the source address. The second column of the rotate-and-mask table 2200 contains a listing of rotate values for the load-high-misaligned-vector instruction and the third column of the rotate-and-mask table 2200 contains a listing of mask values for the load-high-misaligned-vector instruction. The fourth column of the rotate-and-mask table 2200 contains a listing of rotate values corresponding to the load-low-misaligned-vector instruction and the fifth column of the rotate-and-mask table 2200 contains a listing of mask values for the load-high-misaligned-vector instruction.

Depending on the load-misaligned-vector instruction (high or low) and the least significant byte of the source address specified in the instruction (e.g., 0, 4, 8, C, etc.) a rotate value and a mask value can be determined from the table. The resulting rotate value from the table may then be used to configure the multiplexers within the load permute unit to rotate the vector data such that it is aligned when written into the target vector register. The resulting mask value from the table may be used to configure the write enables within the vector register file such that a portion or portions of the vector data may be masked or prevented from being written into the target vector register.

Therefore, in contrast to using an LPC register to configure the logic (e.g., multiplexers) within the load permute unit, embodiments of the invention may configure the LPC register using the memory address of the vector data stored misaligned in memory.

Exemplary Use of Load Misaligned Vector with Permute and Mask Insert

Exemplary load-misaligned-vector instructions used in conjunction with a load permute unit containing logic configured by an LPC register are presented in Table 3 below. These load-misaligned-vector instructions illustrate how two vectors stored misaligned in memory may be aligned as they are loaded into vector registers using a load permute unit. The misaligned vectors (vector A and vector B) used in this example are illustrated in FIG. 10.

TABLE 2

Exemplary Use of Load Misaligned Vector Instruction

| | |
|---|---|
| 01 # Load misaligned vectors, Ra = 0x000, Rb=0x010. | |
| 02 setlpc 1342 | # Set LPC 000 001 010 011 1110 |
| 03 ldvxpwmi Va,Ra,Rb | # Load to Va |
| 04 setlpc 38782 | # Set LPC 100 101 110 111 1110 |
| 05 ldvxpwmi Vb,Ra,Rb | # Load to Vb |

As indicated by the commented first line of code (01), a register within the processor (Ra) may contain a value of 0x000 and a second register within the processor (Rb) may contain a value of 0x010. These values are used in the exemplary code as source memory address. The second line of the code (02) may write a decimal value of 1342 to an LPC register. As described further below, by writing the decimal value of 1342 to the LPC register, the multiplexers within the load permute unit 1605 and the write enables of a vector register may be configured to align and mask data as it passes from memory to a vector register.

The third line of code (03) is an exemplary load-misaligned-vector instruction. The load-misalign-vector instruction in the third line of code is similar to the load-misalign-vector instruction described above with regards to FIG. 20. The load misaligned vector instruction in the third line of the code (03) causes the vector data located in a first memory row specified by the memory address in register Ra (0x000), and the vector data within a second memory row specified by the memory address in register Rb (0x010) to be sent through the multiplexers within the load permute unit 1605. The load-misaligned-vector instruction also causes the data output from the multiplexers within the load permute unit 1605 to be written in the target vector register Va.

For example, if the vector data within memory rows 0x000 and 0x010 is as illustrated in FIG. 11, then an LPC register value of 1342 may configure the multiplexers illustrated in FIG. 19 such that the execution of the ldvxpwmi instruction may cause the first three words of the memory row 0x000 (i.e., Ax, Ay, and Az) to be written in the first three words of the vector register Va, and the last word of the vector register masked. Consequently, the vector register Va may contain vector data as illustrated in FIG. 16 after executing the load-misaligned-vector instruction in the third line of the code (03).

The fourth line of the code (04) may write a decimal value of 38782 to an LPC register. As described further below, by writing the decimal value of 38782 to the LPC register, the multiplexers within the load permute unit 1605 and the write enables of a vector register may be configured to align and mask data as it passes from memory to a vector register.

The fifth line of code (05) is an exemplary load-misaligned-vector instruction. The load-misaligned-vector instruction in the fifth line of the code (05) causes the vector data located in a first memory row specified by the memory address in register Ra (0x000), and the vector data within a second memory row specified by the memory address in register Rb (0x010) to be sent through the multiplexers within the load permute unit 1605. The load-misaligned-vector instruction also causes the data output from the load permute unit 1605 to be written in the target vector register Vb.

For example, if the vector data within memory rows 0x000 and 0x010 is as illustrated in FIG. 11, then an LPC register value of 38782 may configure the multiplexers illustrated in FIG. 19 such that the execution of the ldvxpwmi instruction may cause the last word of the memory row 0x000 (i.e., Bx) to be written in the first word of the vector register Vb, and the first two words of vector data in memory row 0x010 (i.e., By and Bz) to be written in the second and third words of vector register Vb. Furthermore, the LPC register value of 38782 may cause the last word of the vector register Vb to be masked. Consequently, the vector register Vb may contain vector data as illustrated in FIG. 16 after executing the load-misaligned-vector instruction in the fifth line of the code (05).

It should be noted that, for some architectures, it may not be possible to load registers Ra and Rb with two different memory locations at the same time. For such architectures, Ra and Rb may be added together to address a single memory location. In such cases, rather than have just two load instructions, as shown in Table 2, there may be four load instructions.

Since there is only one source in these instructions, to set the multiplexors, the fields in the LPC may only need to be 2 bits each.

CONCLUSION

By placing logic within the store data path, embodiments of the invention allow vector data to be misaligned as it is stored to memory. By misaligning vector data as it is stored to memory, memory bandwidth may be maximized while processing bandwidth required to store vector data misaligned is minimized. Furthermore, embodiments of the invention provide logic within the load data path which allows vector data which is stored misaligned to be aligned as it is loaded into a vector register. By aligning misaligned vector data as it is loaded into a vector register, memory bandwidth may be maximized while processing bandwidth required to align misaligned vector data may be minimized.

Although embodiments of the invention are described and illustrated above as misaligning and aligning vector data at the word level, embodiments of the invention may misalign and align vector data at any level of granularity. For example, according to embodiments of the invention vector data may be misaligned and aligned at a byte level or granularity. In order to align or misalign vector data at the byte level the SPC and LPC registers may require more bits to configure logic within the store permute unit and the load permute unit, respectively.

While the foregoing is directed to embodiments of the present invention, other and further embodiments of the invention may be devised without departing from the basic scope thereof, and the scope thereof is determined by the claims that follow.

What is claimed is:

1. A method for loading data from a processor to memory, comprising:
    configuring at least one multiplexer located within a data path between a vector register file and a memory array containing misaligned vector data;
    receiving a load vector instruction specifying at least one memory address containing vector data and a target vector register;
    aligning the vector data as it passes through the at least one multiplexer; and
    writing the aligned vector data into the target vector register,
    wherein configuring the at least one multiplexer comprises:
        comparing the memory address specified by the load vector instruction to a rotate-and-mask table;
        determining a rotate value based on the rotate and mask table; and
        configuring the multiplexer according to the rotate value.

2. The method of claim 1, further comprising masking a portion of the aligned vector data as it is written into the target vector register.

3. The method of claim 2, wherein masking a portion of the aligned vector data comprises:
    writing to a load vector permute control register comprising a plurality of write enable bits, wherein the write enable bits coupled to write enables of the target vector register; and
    configuring the write enables of the target vector register according to the plurality of write enable bits.

4. The method of claim 2, wherein masking a portion of the aligned vector data comprises:
    comparing the memory address specified by the load vector instruction to a rotate-and-mask table to determine a mask value; and
    configuring write enables of the target vector register according to the mask value.

5. The method of claim 1, wherein the misaligned vector data in memory is misaligned such that the beginning of at least one vector comprising vector data is at a location other than along a boundary of the memory array.

6. A computer readable medium containing a program which, when executed, performs operations comprising:
    configuring at least one multiplexer located within a data path between a vector register file and a memory array containing misaligned vector data;
    receiving a load vector instruction specifying at least one memory address containing vector data and a target vector register;
    aligning the vector data as it passes through the at least one multiplexer; and
    writing the aligned vector data into the target vector register,
    wherein configuring at least one multiplexer comprises:
        comparing the memory address specified by the load vector instruction to a rotate-and-mask table;
        determining a rotate value based on the rotate and mask table; and
        configuring the multiplexer according to the rotate value.

7. The computer readable medium of claim 6, wherein the operations further comprise masking a portion of the aligned vector data as it is written into the target vector register.

8. The computer readable medium of claim 7, wherein masking a portion of the aligned vector data comprises:
    writing to a load vector permute control register comprising a plurality of write enable bits, wherein the write enable bits coupled to write enables of the target vector register; and
    configuring the write enables of the target vector register according to the plurality of write enable bits.

9. The computer readable medium of claim 7, wherein masking a portion of the aligned vector data comprises:
    comparing the memory address specified by the load vector instruction to a rotate-and-mask table to determine a mask value; and
    configuring write enables of the target vector register according to the mask value.

10. A system, comprising a plurality of processors communicably coupled with one another, wherein each processor comprises:
    a register file comprising a plurality of vector registers;
    a memory array containing misaligned vector data;
    logic configured to receive a load-misaligned-vector instruction specifying at least one source memory address in the memory array and a target vector register, and wherein the logic is configured execute the load-misaligned-vector instruction by transferring vector data from the memory array to the target vector register; and
    a load permute unit in a data path between the register file and the memory array configured to align the vector data as it is transferred from the memory array to the target vector register, wherein the load permute unit comprises at least one multiplexer, wherein the multiplexer comprises a plurality of inputs coupled to the memory array and at least one output coupled to the target vector register, wherein the multiplexer is configured to align the vector data as the vector data is transferred through the load permute unit, wherein the load permute unit is configured to determine a rotate value based on the source memory address specified in the load-misaligned-vector instruction and configure the multiplexer based on the rotate value, and wherein the load permute unit determines a rotate value based on the source memory address using a rotate-and-mask table comprising a plurality of rotate values corresponding to source memory addresses.

11. The system of claim 10, further comprising a load permute unit control register comprising a plurality of bits, the plurality of bits coupled to a select input of the multiplexer; and wherein the logic is configured receive a write instruction to the load permute unit control register, wherein the write instruction to the load permute unit control register configures the multiplexer to align the vector data.

12. The system of claim 10, wherein the load permute unit is further configured to mask a portion of the vector data from the source memory address.

13. The system of claim 12, further comprising a load permute unit control register comprising a plurality of bits, wherein a portion of the bits are coupled to write enables of the target vector register; and wherein the logic is configured receive a write instruction to the portion of bits coupled to the written enable of the target vector register, and wherein the write instruction to the load permute unit control register configures the load permute unit to mask a portion of the vector data from the source memory address.

* * * * *